US009988028B2

(12) United States Patent
Oosawa et al.

(10) Patent No.: US 9,988,028 B2
(45) Date of Patent: Jun. 5, 2018

(54) BRAKE APPARATUS

(71) Applicant: Hitachi Automotive Systems, Ltd., Hitachinaka-shi, Ibaraki (JP)

(72) Inventors: Toshiya Oosawa, Yokohama (JP); Asahi Watanabe, Kawasaki (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 0 days. days.

(21) Appl. No.: 15/508,324

(22) PCT Filed: Aug. 31, 2015

(86) PCT No.: PCT/JP2015/074628
§ 371 (c)(1),
(2) Date: Mar. 2, 2017

(87) PCT Pub. No.: WO2016/035742
PCT Pub. Date: Mar. 10, 2016

(65) Prior Publication Data
US 2017/0282876 A1 Oct. 5, 2017

(30) Foreign Application Priority Data
Sep. 3, 2014 (JP) .................................. 2014-178635

(51) Int. Cl.
*B60T 13/66* (2006.01)
*B60T 8/40* (2006.01)
(Continued)

(52) U.S. Cl.
CPC .............. *B60T 8/409* (2013.01); *B60T 7/042* (2013.01); *B60T 13/143* (2013.01); *B60T 13/66* (2013.01)

(58) Field of Classification Search
CPC . B60T 7/042; B60T 8/40; B60T 8/409; B60T 8/4081; B60T 13/14; B60T 13/68; B60T 13/143; B60T 13/146; B60T 13/686
(Continued)

(56) References Cited

U.S. PATENT DOCUMENTS 6,464,307 B1 * 10/2002 Yoshino .................. B60T 7/042
303/11
6,494,547 B2 * 12/2002 Higashimura ............ B60T 8/00
188/156

(Continued)

FOREIGN PATENT DOCUMENTS

JP 2001-213294 A 8/2001
JP 2007-210372 A 8/2007
(Continued)

OTHER PUBLICATIONS

International Search Report (PCT/ISA/210) issued in PCT Application No. PCT/JP2015/074628 dated Oct. 13, 2015 with English-language translation (three (3) pages).
(Continued)

*Primary Examiner* — Christopher P Schwartz
(74) *Attorney, Agent, or Firm* — Crowell & Moring LLP

(57) ABSTRACT

A brake apparatus activates a stroke simulator OUT valve in a valve-closing direction to increase a pressure in a wheel cylinder with use of brake fluid flowing out of the stroke simulator according to a state of an operation performed by a driver on a brake pedal. Further, when the hydraulic pressure in the wheel cylinder or a first oil passage is brought into a predetermined state, the brake apparatus activates the stroke simulator OUT valve in a valve-opening direction to cause the brake fluid in the stroke simulator to flow out to a low-pressure portion while restricting the brake fluid in the stroke simulator to a predetermined flow amount.

20 Claims, 8 Drawing Sheets

(51) Int. Cl.
*B60T 13/14* (2006.01)
*B60T 7/04* (2006.01)

(58) Field of Classification Search
USPC .................. 303/6.01, 10, 113.1–113.4, 114.1
See application file for complete search history.

(56) References Cited

U.S. PATENT DOCUMENTS

| | | | | |
|---|---|---|---|---|
| 7,325,884 | B2* | 2/2008 | Ganzel | B60T 8/3655 |
| | | | | 303/113.1 |
| 7,770,982 | B2* | 8/2010 | Gottwick | B60T 13/145 |
| | | | | 303/11 |
| 9,527,486 | B2* | 12/2016 | Maruo | B60T 8/4081 |
| 2005/0151418 | A1* | 7/2005 | Bickel | B60T 7/042 |
| | | | | 303/122 |
| 2005/0162008 | A1* | 7/2005 | Bickel | B60T 8/4081 |
| | | | | 303/113.4 |
| 2011/0175437 | A1* | 7/2011 | Yamamoto | B60T 8/3655 |
| | | | | 303/14 |
| 2012/0283926 | A1* | 11/2012 | Ito | B60T 8/4018 |
| | | | | 701/70 |
| 2015/0314765 | A1 | 11/2015 | Maruo et al. | |
| 2015/0367828 | A1* | 12/2015 | Oosawa | B60T 17/221 |
| | | | | 303/6.01 |
| 2016/0221553 | A1* | 8/2016 | Watanabe | B60T 7/042 |

FOREIGN PATENT DOCUMENTS

| | | |
|---|---|---|
| JP | 2010-83411 A | 4/2010 |
| JP | 2014-118014 A | 6/2014 |

OTHER PUBLICATIONS

Japanese-language Written Opinion (PCT/ISA/237) issued in PCT Application No. PCT/JP2015/074628 dated Oct. 13, 2015 (three (3) pages).

* cited by examiner

BRAKE APPARATUS

TECHNICAL FIELD

The present invention relates to a brake apparatus mounted on a vehicle.

BACKGROUND ART

Conventionally, there has been known a brake apparatus including a stroke simulator for creating an operation reaction force accompanying a brake operation of a driver and capable of increasing a pressure in a wheel cylinder with use of a hydraulic pressure generated from a hydraulic source prepared separately form a master cylinder (for example, PTL 1).

CITATION LIST

Patent Literature

PTL 1: Japanese Patent Application Public Disclosure No. 2010-83411

SUMMARY OF INVENTION

Technical Problem

However, if attempting to improve responsiveness of the increase in the pressure in the wheel cylinder, the conventional brake apparatus may end up increases in a size and cost of an actuator regarding the hydraulic source.

An object of the present invention is to allow the brake apparatus to improve the responsiveness of the increase in the pressure in the wheel cylinder while preventing or cutting down, for example, the increase in the size of the actuator.

An object of the present invention is to provide a brake apparatus capable of improving the responsiveness of the increase in the pressure in the wheel cylinder while preventing or cutting down, for example, the increase in the size of the actuator.

Solution to Problem

To achieve the above-described objects, a brake apparatus according to one aspect of the present invention is preferably configured to increase a pressure in a wheel cylinder with use of brake fluid flowing out of a stroke simulator activated according to a brake operation performed by a driver.

DESCRIPTION OF EMBODIMENTS

Figure 1:
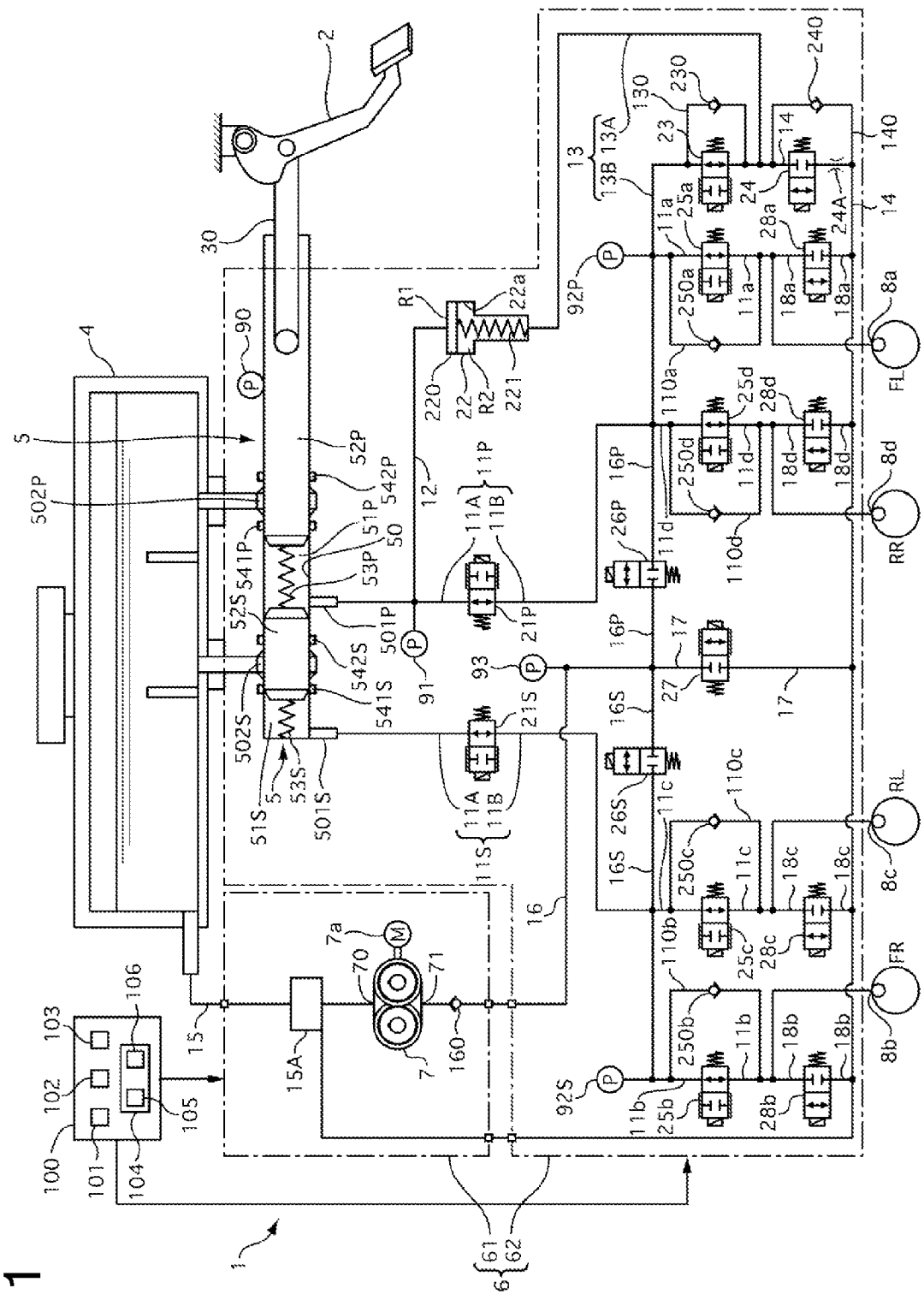
FIG. 1 schematically illustrates a configuration of a brake apparatus according to a first embodiment.

In the following description, embodiments for realizing a brake apparatus according to the present invention will be described based on exemplary embodiments illustrated in the drawings.

First Embodiment

Configuration

First, a configuration will be described. FIG. 1 schematically illustrates a configuration of a brake apparatus (hereinafter referred to as an apparatus 1) according to a first embodiment. The apparatus 1 is a hydraulic brake apparatus preferably usable for a brake system of an electric vehicle, such as a hybrid automobile including a motor generator (a rotational electric machine) besides an engine (an internal combustion engine) and an electric automobile including only the motor generator as a prime mover for driving wheels. The apparatus 1 may also be applied to a vehicle using only the engine as the driving force source. The apparatus 1 supplies brake fluid into a wheel cylinder 8 provided at each of wheels FL to RR of the vehicle to generate a brake hydraulic pressure (a wheel cylinder hydraulic pressure Pw), thereby providing a hydraulic braking force to each of the wheels FL to RR. The wheel cylinder 8 may be a cylinder of a hydraulic brake caliper in a disk brake mechanism, besides a wheel cylinder in a drum brake mechanism. The apparatus 1 includes two brake pipe systems, i.e., a P (primary) system and an S (secondary) system, and employs, for example, X-split pipe configuration. The apparatus 1 may employ another pipe configuration, such as a front/rear split pipe configuration. Hereinafter, when a member provided in correspondence with the P system and a member provided in correspondence with the S system should be distinguished from each other, indices P and S will be added at the ends of the respective reference numerals.

The brake pedal 2 is a brake operation member that receives an input of a brake operation from an operator (a driver). One end of a push rod 30 is rotatably connected to a base side of the brake pedal 2. The master cylinder 5 generates a brake hydraulic pressure (a master cylinder hydraulic pressure Pm) by being activated by an operation performed on the brake pedal 2 by the driver (the brake operation). The brake apparatus 1 according to the present embodiment does not include a negative-pressure booster that boosts or amplifies a brake operation force (a force Fp pressing the brake pedal 2) by utilizing an intake negative pressure generated by the engine of the vehicle. The master cylinder 5 is connected to the brake pedal 2 via the push rod 3, and is also replenished with the brake fluid from a reservoir tank (a reservoir) 4. The reservoir 4 is a brake fluid source that stores the brake fluid therein, and is a low-pressure portion opened to an atmospheric pressure. The master cylinder 5 is a tandem-type master cylinder, and includes, as master cylinder pistons axially displaceable according to the brake operation, a primary piston 52P connected to the push rod 30 and a secondary piston 52S configured as a free piston. A stroke sensor 90 is provided inside the master cylinder 5. The stroke sensor 90 detects an amount of the axial displacement of the primary piston 52P. The amount of the axial displacement of the primary piston 52P corresponds to an amount of a displacement of the brake pedal (a pedal stroke Sp). The apparatus 1 may be configured to detect the pedal stroke Sp by including the stroke sensor 90 on the push rod 30 or the brake pedal 2.

The apparatus 1 includes a hydraulic control unit 6 and an electronic control unit 100. The hydraulic control unit 6 is a braking control unit capable of generating the brake hydraulic pressure independently of the brake operation performed by the driver by receiving supply of the brake fluid from the reservoir tank 4 or the master cylinder 5. The electronic control unit (hereinafter referred to as the ECU) 100 is a control unit that controls activation of the hydraulic control unit 6.

The hydraulic control unit 6 is provided between the wheel cylinder 8 and the master cylinder 5, and can supply the master cylinder hydraulic pressure Pm or a control hydraulic pressure to each of the wheel cylinders 8 individually. The hydraulic control unit 6 includes, as hydraulic devices (actuators) for generating the control hydraulic pressure, a motor 7a of a pump 7 and a plurality of control valves (an electromagnetic valve 21 and the like). The pump 7 introduces the brake fluid therein from the reservoir tank 4, and discharges the brake fluid toward the wheel cylinder 8. In the present embodiment, the pump 7 is embodied with use of a gear pump excellent in terms of a noise and vibration performance and the like, in particular, an external gear-type pump unit, but is not limited thereto and may be embodied with use of, for example, a plunger pump. The pump 7 is used in common by both the systems, and is rotationally driven by the electric motor (a rotational electric machine) 7a as a common driving source. The motor 7a can be embodied with use of, for example, a brushed motor. A resolver is mounted on an output shaft of the motor 7a, and the resolver detects a rotational position (a rotational angle) thereof. The electromagnetic valve 21 and the like are each opened and closed according to a control signal to switch a communication state of an oil passage 11 or the like, thereby controlling a flow of the brake fluid. The hydraulic control unit 6 is provided so as to be able to increase the pressure in the wheel cylinder 8 with use of the hydraulic pressure generated by the pump 7 with the master cylinder 5 and the wheel cylinders 8 out of communication with each other. The hydraulic control unit 6 includes a stroke simulator 22. The stroke simulator 22 is activated according to the brake operation performed by the driver, and generates the pedal stroke Sp by an inflow of the brake fluid from the master cylinder 5. Further, the hydraulic control unit 6 includes hydraulic sensors 91 to 93, which detect hydraulic pressures at various locations such as a pressure discharged from the pump 7 and the master cylinder pressure Pm.

Information input to the ECU 100 includes detected values transmitted from the resolver, the pedal stroke sensor 90, and the hydraulic sensors 91 to 93, and information regarding a running state transmitted from the vehicle side. The ECU 100 engages in information processing based on these various kinds of information according to a program installed therein. Further, the ECU 100 outputs a control instruction to each of the actuators in the hydraulic control unit 6 according to a result of this processing, thereby controlling them. More specifically, the ECU 100 controls opening/closing operations of the electromagnetic valve 21 and the like, and the number of rotations of the motor 7a (i.e., an amount discharged from the pump 7). By this control, the ECU 100 realizes various kinds of brake control by controlling the wheel cylinder hydraulic pressure Pw at each of the wheels FL to RR. For example, the ECU 100 realizes boosting control for assisting the brake operation by generating the hydraulic braking force to cover insufficiency from the brake operation force input by the driver, anti-lock control for preventing or reducing a slip (a lock tendency) of any of the wheels FL to RR that is caused from the braking, brake control for controlling a motion of the vehicle (vehicle behavior stabilization control such as electronic stability control, which will be hereinafter referred to as ESC), automatic brake control such as adaptive cruise control, regenerative cooperative brake control for controlling the wheel cylinder hydraulic pressure Pw so as to achieve a target deceleration (a target braking force) by collaborating with the regenerative brake, and the like.

The master cylinder 5 is connected to the wheel cylinder 8 via a first oil passage 11, which will be described below, and is a first hydraulic source capable of increasing the wheel cylinder hydraulic pressure Pw. The master cylinder 5 can increase the pressures in the wheel cylinders 8a and 8d via an oil passage (a first oil passage 11P) of the P system with use of the master cylinder hydraulic pressure Pm generated in a primary hydraulic chamber 51P, and can also increase the pressures in the wheel cylinders 8b and 8c via an oil passage (a first oil passage 11S) of the S system with use of the master cylinder hydraulic pressure Pm generated in a second hydraulic chamber 51S. The piston 52 of the master cylinder 5 is inserted in a bottomed cylindrical cylinder 50 axially displaceably along an inner peripheral surface thereof. The cylinder 50 includes a discharge port (a supply port) 501 and a replenishment port 502 for each of the P and S systems. The discharge port 501 is provided so as to be connectable to the hydraulic control unit 6 to be communicable with the wheel cylinders 8. The replenishment port 502 is connected to the reservoir tank 4 to be communicated with the reservoir 4. A coil spring 53P as a return spring is set in the primary hydraulic chamber 51P between both the pistons 52P and 52S in a pressed and compressed state. A coil spring 53S is set in the secondary hydraulic chamber 51S between the piston 52S and an axial end of the cylinder 50 in a pressed and compressed state. The discharge ports 501 are constantly opened to the hydraulic chambers 51P and 51S, respectively.

Piston seals 54 (corresponding to 541 and 542 in the drawing) are disposed on an inner periphery of the cylinder 50. The piston seals 54 seal between respective outer peripheral surfaces of the pistons 52P and 52S and the inner peripheral surface of the cylinder 50 while being in sliding constant with the pistons 52P and 52S, respectively. Each of the piston seals 54 is a known seal member (a cup seal) cup-shaped in cross-section and including a lip portion on an inner diameter side. The piston seal 54 permits a flow of the brake fluid in one direction with the lip portion in contact with the outer peripheral surface of the piston 52 while prohibiting or reducing a flow of the brake fluid in the other direction. The first piston seal 541 permits a flow of the brake fluid from the replenishment port 502 toward the hydraulic chamber 51 (the discharge port 501) while prohibiting or reducing a flow of the brake fluid in an opposite direction. The second piston seal 542P prohibits or reduces a flow of the brake fluid from the replenishment port 502P toward one side where the brake pedal 2 is located. The second piston seal 542S prohibits or reduces a flow of the brake fluid from the primary hydraulic chamber 51P toward the replenishment port 502S. When the piston 52 is stroked toward an axially opposite side from the brake pedal 2 by the driver's operation of pressing the brake pedal 2, a volume of the hydraulic chamber 51 reduces, so that a hydraulic pressure (the master cylinder hydraulic pressure Pm) is generated therein. As a result, the brake fluid is supplied from the hydraulic chamber 51 toward the wheel cylinder 8 via the discharge port 501. Generally same hydraulic pressures are generated in both the hydraulic chambers 51P and 51S.

In the following description, a brake hydraulic circuit of the hydraulic control unit 6 will be described with reference to FIG. 1. Members corresponding to the individual wheels FL to RR will be distinguished from one another if necessary, by indices a to d added at the ends of reference numerals thereof, respectively. The first oil passage 11 connects the discharge port 501 (the hydraulic chamber 51) of the master cylinder 5 and the wheel cylinder 8. A cut valve (a shut-off valve) 21 is a normally-opened (opened when no power is supplied) electromagnetic valve provided in the first oil passage 11. The first oil passage 11 is divided into an oil passage 11A on a master cylinder 5 side and an oil passage 11B on a wheel cylinder 8 side by the cut valve 21. A solenoid IN valve (a pressure-increase valve) SOL/V IN 25 is a normally-opened electromagnetic valve provided in correspondence with each of the wheels FL to RR (in each of oil passages 11a to 11d) on the wheel cylinder 8 side with respect to the cut valve 21 (the oil passage 11B) in the first oil passage 11. A bypass oil passage 110 is provided in parallel with the first oil passage 11 while bypassing the SOL/V IN 25. A check valve (a one-way valve or a non-return valve) 250 is provided in the bypass oil passage 110. The check valve 250 permits only a flow of the brake fluid from the wheel cylinder 8 side to the master cylinder 5 side.

An intake oil passage 15 is a low-pressure portion connecting the reservoir tank 4 and an intake portion 70 of the pump 7. A discharge oil passage 16 connects a discharge portion 71 of the pump 7 and a portion in the first oil passage 11 between the cut valve 21 and the SOL/V IN 25 (the oil passage 11B). A check valve 160 is provided in the discharge oil passage 16, and permits only a flow from one side where the discharge portion 71 is located (an upstream side) to another side where the first oil passage 11 is located (a downstream side). The check valve 160 is a discharge valve (a first one-direction valve) provided to the pump 7. The discharge oil passage 16 branches into a discharge oil passage 16P of the P system and a discharge oil passage 16S of the S system on the downstream side of the check valve 160. The oil passages 16P and 16S are connected to the first oil passage 11P of the P system and the first oil passage 11S of the S system, respectively. The discharge oil passages 16P and 16S form a communication passage connecting the first oil passages 11P and 11S to each other. A communication valve 26P is a normally-closed (closed when no power is supplied) electromagnetic valve provided in the discharge oil passage 16P. A communication valve 26S is a normally-closed electromagnetic valve provided in the discharge oil passage 16S. The pump 7 is a second hydraulic source capable of generating the hydraulic pressure in the first oil passage 11 with use of the brake fluid supplied from the reservoir tank 4. The pump 7 is connected to the wheel cylinders 8a to 8d via the above-described communication passages (the discharge oil passages 16P and 16S) and the first oil passages 11P and 11S, and can increase the wheel cylinder hydraulic pressures Pw by discharging the brake fluid to the above-described communication passages (the discharge oil passages 16P and 16S).

A first pressure reduction oil passage 17 connects a portion in the discharge oil passage 16 between the check valve 160 and the communication valve 26, and the intake oil passage 15. A pressure adjustment valve 27 is a normally-opened electromagnetic valve as a first pressure reduction valve provided in the first pressure reduction oil passage 17. A second pressure reduction oil passage 18 connects the wheel cylinder 8 side of the first oil passage 11 with respect to the SOL/IN 25 (the oil passage 11B), and the intake oil passage 15. A solenoid OUT valve (a pressure reduction valve) SOL/V OUT 28 is a normally-closed electromagnetic valve as a second pressure reduction valve provided in the second pressure reduction oil passage 18. In the present embodiment, the first pressure reduction oil passage 17 on one side closer to the intake oil passage 15 with respect to the pressure adjustment valve 27, and the second pressure reduction oil passage 18 on one side closer to the intake oil passage 15 with respect to the SOL/V OUT 28 share a part thereof with each other.

The stroke simulator 22 includes a piston 220 and a spring 221. The piston 220 is a partition wall separating an inside of a cylinder 22a of the stroke simulator 22 into two chambers (a positive pressure chamber R1 and a backpressure chamber R2), and is provided displaceably in the cylinder 22a in an axial direction. The axial direction refers to a direction in which the spring 221 is deformed. A not-illustrated seal member is set on an outer peripheral surface of the piston 220 that faces an inner peripheral surface of the cylinder 22a. This seal member seals the outer peripheral side of the piston 220, thereby prohibiting or reducing a flow of the brake fluid between the positive pressure chamber (a primary chamber) R1 and the backpressure chamber (an auxiliary chamber) R2 to maintain fluid-tightness between these chambers R1 and R2. The spring 221 is a coil spring (an elastic member) set in the backpressure chamber R2 in a pressed and compressed state, and is a biasing member constantly biasing the piston 220 toward one side where the positive pressure chamber R1 is located (in a direction for reducing a volume of the positive pressure chamber R1 and increasing a volume of the backpressure chamber R2). The spring 221 is provided so as to be able to generate a reaction force according to an amount of the displacement (a stroke amount) of the piston 220.

A second oil passage 12 is a branch oil passage that branches off from a portion (the oil passage 11A) in the first oil passage 11P between the discharge port 501P (the primary hydraulic chamber 51P) of the master cylinder 5 and the cut valve 21P, and is connected to the positive-pressure chamber R1 of the stroke simulator 22. A third oil passage 13 is a first backpressure oil passage connecting the backpressure chamber R2 of the stroke simulator 22 and the first oil passage 11. More specifically, the third oil passage 13 branches off from a portion (the oil passage 11B) in the first oil passage 11P between the cut valve 21P and the SOL/V IN 25, and is connected to the backpressure chamber R2. A stroke simulator IN valve SS/V IN 23 is a normally-opened electromagnetic valve (a first simulator cut valve) provided in the third oil passage 13. The third oil passage 13 is divided into the oil passage 13A on the backpressure chamber R2 side and the oil passage 13B on the first oil passage 11 side by the SS/V IN 23. A bypass oil passage 130 is provided in parallel with the third oil passage 13 while bypassing the SS/V IN 23. The bypass oil passage 130 connects the oil passage 13A and the oil passage 13B. A check valve 230 is provided in the bypass oil passage 130. The check valve 230 permits a flow of the brake fluid from the backpressure chamber R2 side (the oil passage 13A) toward the first oil passage 11 side (the oil passage 13B), and prohibits or reduces a flow of the brake fluid in an opposite direction.

A fourth oil passage 14 is a second backpressure oil passage connecting the backpressure chamber R2 of the stroke simulator 22 and the reservoir tank 4. The fourth oil passage 14 is provided so as to permit both a flow of the brake fluid from the backpressure chamber R2 and a flow of the brake fluid from the reservoir tank 4. More specifically, the fourth oil passage 14 connects a portion (the oil passage 13A) in the third oil passage 13 between the backpressure chamber R2 and the SS/V IN 23, and the intake oil passage 15 (or the first pressure reduction oil passage 17 on the intake oil passage 15 side with respect to the pressure adjustment valve 27 and the second pressure reduction oil passage 18 on the intake oil passage 15 side with respect to the SOL/V OUT 28). The fourth oil passage 14 may be directly connected to the backpressure chamber R2 or the reservoir tank 4. In the present embodiment, a part of the fourth oil passage 14 on the backpressure chamber R2 side is shared with the third oil passage 13 (13A), and a part of the fourth oil passage 14 on the reservoir tank 4 side is shared with the intake oil passage 15 and the like, whereby the configuration of the oil passage can be simplified as a whole. A stroke simulator OUT valve SS/V OUT 24 is a normally-closed electromagnetic valve (a second simulator cut valve) provided in the fourth oil passage 14. When the fourth oil passage 14 is interpreted as the oil passage directly connected to the backpressure chamber R2, the third oil passage 13 is interpreted as connecting a portion in the fourth oil passage 14 between the backpressure chamber R2 and the SS/V OUT 24, and the oil passage 11B.

An orifice portion (orifice) 24A is provided in the fourth oil passage 14 in series with the SS/V OUT 24 on the reservoir tank 4 (the intake oil passage 15) side with respect to the SS/V OUT 24, as a resistance portion having a flow passage resistance. More specifically, the orifice portion 24A is provided to the SS/V OUT 24, and is prepared integrally with a unit of the SS/V OUT 24. The orifice portion 24A is provided in the SS/V OUT 24 so as to be located on the reservoir tank 4 (the intake oil passage 15) side with respect to a valve body of the SS/V OUT 24, and to restrict (reduce) a cross-sectional area of the flow passage of the SS/V OUT 24 in a valve-opened state. The orifice portion 24A may be provided in the fourth oil passage 14 formed in a housing of a second unit 62 instead of being prepared integrally with the unit of the SS/V OUT 24. Further, a bypass oil passage 140 is provided in parallel with the fourth oil passage 14 while bypassing the orifice portion 24A and the SS/V OUT 24. A check valve 240 is provided in the bypass oil passage 140. The check valve 240 permits a flow of the brake fluid from the reservoir tank 4 (the intake oil passage 15) side toward the third oil passage 13 (the oil passage 13A) side, i.e., the backpressure chamber R2 side, and prohibits or reduces a flow of the brake fluid in an opposite direction.

The cut valve 21, the SS/V IN 23, the SOL/V IN 25, and the pressure adjustment valve 27 are each a proportional control valve, an opening degree of which is adjusted according to a current supplied to a solenoid. The other valves, i.e., the SS/V OUT 24, the communication valve 26, and the SOL/V OUT 28 are two-position (ON/OFF) valves, opening/closing of which is controlled to be switched between two values, i.e., switched to be either opened or closed. The above-described other valves can also be embodied with use of the proportional control valve. The hydraulic sensor 91 is provided in the first oil passage 11P between the cut valve 21P and the master cylinder 5 (the oil passage 11A). The hydraulic sensor 91 detects a hydraulic pressure at this portion (the master cylinder hydraulic pressure Pm and the hydraulic pressure in the positive pressure chamber R1 of the stroke simulator 22). The hydraulic sensor 91 may be provided in the second oil passage 12 or the oil passage 11A of the S system. The hydraulic sensor (a primary system pressure sensor or a secondary system pressure sensor) 92 is provided in the first oil passage 11 between the cut valve 21 and the SOL/V IN 25. The hydraulic senor 92 detects a hydraulic pressure at this portion (the wheel cylinder hydraulic pressure Pw). The hydraulic sensor 93 is provided in the discharge oil passage 16 between the discharge portion 71 of the pump 7 (the check valve 160) and the communication valve 26. The hydraulic senor 93 detects a hydraulic pressure at this portion (the pump discharge pressure). The hydraulic sensor 93 may be provided in the first pressure reduction oil passage 17 between a portion thereof connected to the discharge oil passage 16 and the pressure adjustment valve 27.

The hydraulic control unit 6 includes a first unit 61 and the second unit 62. The first unit 61 is a pump unit including the pump 7 and the motor 7a. The second unit 62 is a valve unit containing each of the valves 21 and the like. The first and second units 61 and 62 control each of the actuators according to the control instruction from the ECU 100. The second unit 62 includes the stroke simulator 22 and each of the sensors 90 to 93, and also includes the master cylinder 5 integrally provided therewith. Further, the reservoir tank 4 is integrally mounted on the second unit 62. In other words, the master cylinder 5 and the stroke simulator 22 are contained in the same housing and form a single master cylinder unit. As viewed in another manner, the above-described valve unit is integrally provided to the above-described master cylinder unit, and they form a single unit as a whole. More specifically, the master cylinder 5, the stroke simulator 22, the valve 21, and the like are contained in the same housing. How to unitize each of the actuators, the sensors, and the like in the hydraulic control unit 6 can be arbitrarily designed. For example, a stroke simulator unit, which includes the cut valve 21P of the P system and the hydraulic sensor 91 in addition to the stroke simulator 22, the SS/V IN 23, and the SS/V OUT 24, may be provided. In this case, a unit serving as both the valve unit and the pump unit that includes the other actuators and sensors, i.e., the valves 21S and 25 to 28 other than the above-described valves, the hydraulic sensors 92 and 93, the pump 7, and the motor 7a can be provided as a different unit from the master cylinder 5. These units and the master cylinder 5 may be integrally installed or connected to each other via a pipe.

A fluid pool 15A having a predetermined volume is provided in the intake oil passage 15. The fluid pool 15A is a reservoir inside the hydraulic control unit 6. The fluid pool 15A is disposed close to a portion inside the first unit 61 to which a brake pipe forming the intake oil passage 15 is connected (orthogonally above the first unit 61). The pump 7 introduces the brake fluid therein from the reservoir tank 4 via the fluid pool 15A. The first and second pressure reduction oil passages 17 and 18, and the fourth oil passage 14 are connected to the fluid pool 15A. The brake fluid in the first and second pressure reduction oil passages 17 and 18, and the fourth oil passage 14 is returned to the reservoir tank 4 via the fluid pool 15A.

A first system is formed by a brake system (the first oil passage 11) connecting the hydraulic chamber 51 of the master cylinder 5 and the wheel cylinder 8 with the cut valve 21 controlled in a valve-opening direction. This first system creates the wheel cylinder hydraulic pressure Pw from the master cylinder hydraulic pressure Pm generated with use of the pressing force Fp, thereby realizing pressing force brake (non-boosting control). On the other hand, a second system is formed by a brake system (the intake oil passage 15, the discharge oil passage 16, and the like) including the pump 7 and connecting the reservoir tank 4 (the fluid pool 15A) and the wheel cylinder 8 with the cut valve 21 controlled in a valve-closing direction. This second system constructs a so-called brake-by-wire device, which creates the wheel cylinder hydraulic pressure Pw from the hydraulic pressure generated with use of the pump 7, thereby realizing boosting control and the like as brake-by-wire control.

At the time of the brake-by-wire control, the stroke simulator 22 creates an operation reaction force accompanying the brake operation performed by the driver. Hereinafter, the hydraulic pressure in the positive pressure chamber R1 of the stroke simulator 22 will be referred to as a positive pressure (a primary-side pressure) P1, and the hydraulic pressure in the backpressure chamber R2 or the third oil passage 13 (the oil passage 13A) will be referred to as a backpressure (a secondary-side pressure) P2. When the driver performs the brake operation (presses the brake pedal 2 or returns the pressed brake pedal 2) with the cut valve 21 controlled in the valve-closing direction and the master cylinder 5 and the wheel cylinder 8 out of communication with each other, the stroke simulator 22 generates the pedal stroke Sp by introducing or discharging the brake fluid from and to the master cylinder 5. More specifically, the brake fluid is delivered from the master cylinder 5 (the primary hydraulic chamber 51P) to the first oil passage 11P by an amount according to the pedal stroke Sp. This delivered brake fluid is conveyed into the positive pressure chamber R1 of the stroke simulator 22 via the second oil passage 12. Now, assume that F1 represents a force pressing the piston 220 to one axial side (in the direction for increasing the volume of the positive pressure chamber R1 and reducing the volume of the back pressure chamber R2) by application of the positive pressure P1 (the master cylinder hydraulic pressure Pm as that) to a pressure-receiving surface of the piston 220. Assume that F2 represents a force pressing the piston 220 to the other axial side (in a direction for reducing the volume of the positive pressure chamber R1 and increasing the volume of the backpressure chamber R2) by application of the backpressure P2 to a pressure-receiving surface of the piston 220. Assume that F3 represents a force with which the spring 221 biases the piston 220 to the above-described other axial side. When F1 is larger than a sum of F2 and F3 (F2+F3), the piston 220 is stroked to the one axis side while pressing and compressing the spring 221. As a result, the volume of the positive pressure chamber R1 increases to cause the brake fluid to flow into the positive pressure chamber R1, and at the same time, the brake fluid flows out of the backpressure chamber R2 to the third oil passage 13 (the oil passage 13A) by an amount equivalent to an amount flowing into the positive pressure chamber R1 (according to the pedal stroke Sp). When the SS/V OUT 24 is controlled in the valve-opening direction to establish the communication between the backpressure chamber R2 and the reservoir tank 4, the brake fluid is discharged from the backpressure chamber R2 to the reservoir tank 4 via the fourth oil passage 14. The fourth oil passage 14 does not necessarily have to be connected to the reservoir tank 4 as long as the fourth oil passage 14 is connected to a low-pressure portion into which the brake fluid can flow. When F1 falls below the sum of F2 and F3, the piston 220 returns toward an initial position thereof.

When a change in a pedal stroke speed $\Delta Sp/\Delta t$ is small (for example, when the vehicle is not in a sudden brake operation state), and thus the volume of the positive pressure chamber R1 increases at a less changing speed (a stroke speed of the piston 220), F1 can be regarded as being generally balanced with the sum of F2 and F3. In this case, the force F2 due to the backpressure P2 corresponds to a force resultant from subtracting F3 from F1. Then, the biasing force F3 of the spring 221 acting on the piston 220 is a value acquired by multiplying the stroke amount of the piston 220 (an amount by which the spring 221 is compressed) by an elastic coefficient (a spring constant) k of the spring 221. Further, the stroke amount of the piston 220 can be deemed the same as the pedal stroke Sp. Therefore, F3 can be calculated from the pedal stroke Sp. Further, F1 can be calculated from the master cylinder hydraulic pressure Pm. Therefore, the backpressure P2 can be estimated from the value Sp detected by the stroke sensor 90 and the value Pm detected by the hydraulic sensor 91.

Further, the master cylinder hydraulic pressure Pm generates the reaction force of the brake pedal 2 (hereinafter referred to as a pedal reaction force) by being applied to a pressure-receiving surface of the piston 52P of the master cylinder 5. In other words, the force F1 due to Pm corresponds to the pedal reaction force. The pedal reaction force corresponds to the pressing force Fp. When F1 can be regarded as being generally balanced with the sum of F2 and F3, the pedal reaction force Fp (corresponding to F1) is determined from how large the backpressure P2 (corresponding to F2) is and how much the spring 221 (corresponding to F3) is compressed (the stroke amount of the piston 220). For example, an increase in the pedal stroke Sp (an increase in the stroke amount of the piston 220) leads to an increase in F1 via an increase in F3, and this is reflected in how the driver feels when operating the pedal (a pedal feeling) as an increase in the pedal reaction force Fp. The pedal reaction force according to the operation performed on the brake pedal 2 is created in this manner. In the above-described manner, the stroke simulator 22 introduces therein the brake fluid from the master cylinder 5 and also generates the pedal reaction force, thereby simulating fluid stiffness of the wheel cylinder 8 to reproduce an appropriate feeling that the driver would have when pressing the pedal.

The ECU 100 includes a brake operation state detection unit 101, a target wheel cylinder hydraulic pressure calculation unit 102, a pressing force brake creation unit 103, and a wheel cylinder hydraulic control unit 104. The brake operation state detection unit 101 detects the pedal stroke Sp as the brake operation amount input by the driver upon receiving the input of the value detected by the stroke sensor 90. More specifically, the brake operation state detection unit 101 calculates Sp by acquiring the value output from the stroke sensor 90 (the amount of the axial displacement of the primary piston 52P). Further, the brake operation state detection unit 101 detects whether the driver is performing the brake operation (whether the brake pedal 2 is being operated) and also detects or estimates a speed of the brake operation performed by the driver, based on Sp. More specifically, the brake operation state detection unit 101 detects or estimates the brake operation speed by calculating the speed of the change in Sp (the pedal stroke speed $\Delta Sp/\Delta t$). A pressing force sensor for detecting the pressing force Fp may be provided and the brake operation state detection unit 101 may be configured to detect or estimate the brake operation amount based on a vale detected thereby. Further, the brake operation state detection unit 101 may be configured to detect or estimate the brake operation amount based on the value detected by the hydraulic sensor 91. In other words, the brake operation state detection unit 101 may use not only Sp but also another appropriate variable as the brake operation amount to be used in the control.

The target wheel cylinder hydraulic pressure calculation unit 102 calculates a target wheel cylinder hydraulic pressure Pw*. For example, at the time of the boosting control, the target wheel cylinder hydraulic pressure calculation unit 102 calculates, based on detected Sp (the brake operation amount), Pw* that realizes an ideal characteristic about a relationship between Sp and a brake hydraulic pressure requested by the driver (a vehicle deceleration requested by the driver) according to a boosting ratio. In the present embodiment, for example, a predetermined characteristic about the relationship between Sp and Pw (the braking force) realized when the negative-pressure booster is in operation in a brake apparatus including the negative-pressure booster normal in size is the above-described ideal characteristic about the relationship for calculating Pw*. Further, at the time of the anti-lock control, the target wheel cylinder hydraulic pressure calculation unit 102 calculates Pw* of each of the wheels FL to RR so that each of the wheels FL to RR has an appropriate slip amount (an amount by which the speed of this wheel deviates from a simulated speed of the vehicle body). At the time of the ESC, the target wheel cylinder hydraulic pressure calculation unit 102 calculates Pw* of each of the wheels FL to RR so as to realize a desired vehicle motion state based on, for example, a detected amount of a vehicle motion state (a lateral acceleration and/or the like). At the time of the regenerative cooperative brake control, the target wheel cylinder hydraulic pressure calculation unit 102 calculates Pw* in relation to the regenerative braking force. For example, the target wheel cylinder hydraulic pressure calculation unit 102 calculates such Pw* that a sum of the regenerative braking force input from a control unit of a regenerative braking device and a hydraulic braking force corresponding to the target wheel cylinder hydraulic pressure can satisfy the vehicle deceleration requested by the driver.

The pressing force brake creation unit 103 controls the cut valve 21 in the valve-opening direction, thereby bringing the hydraulic control unit 6 into a state capable of creating the wheel cylinder hydraulic pressure Pw from the master cylinder pressure Pm (the first system), thus realizing the pressing force brake. At this time, the pressing force brake creation unit 103 makes the stroke simulator 22 inactive in response to the brake operation performed by the driver by controlling the SS/V OUT 24 in the valve-closing direction. The pressing force brake creation unit 103 may be configured to also control the SS/V IN 23 in the valve-closing direction.

The wheel cylinder hydraulic control unit 104 controls the cut valve 21 in the valve-closing direction, thereby bringing the hydraulic control unit 6 into a state capable of creating the wheel cylinder hydraulic pressure Pw (pressure increase control) with use of the pump 7 (the second system). The wheel cylinder hydraulic control unit 104 controls each of the actuators in the hydraulic control unit 6 in this state, thereby performing hydraulic control (for example, the boosting control) for realizing Pw*. More specifically, the wheel cylinder hydraulic control unit 104 controls the cut valve 21 in the valve-closing direction, the communication valve 26 in the valve-opening direction, and the pressure adjustment valve 27 in the valve-closing direction, and also activates the pump 7. Controlling each of the actuators in this manner allows desired brake fluid to be transmitted from the reservoir tank 4 to the wheel cylinder 8 via the intake oil passage 15, the pump 7, the discharge oil passage 16, and the first oil passage 11. At this time, a desired braking force can be acquired by performing feedback control on the number of rotations of the pump 7 and a valve-opening state (an opening degree and/or the like) of the pressure adjustment valve 27 so that the value detected by the hydraulic sensor 92 approaches Pw*. In other words, Pw can be adjusted by controlling the valve-opening state of the pressure adjustment valve 27 and allowing the brake fluid to leak from the discharge oil passage 16 or the first oil passage 11 to the intake oil passage 15 via the pressure adjustment valve 27 as appropriate. In the present embodiment, Pw is controlled basically by changing the valve-opening state of the pressure adjustment valve 27 instead of the number of rotations of the pump 7 (the motor 7a). For example, an instruction value Nm* for the number of rotations of the motor 7a is kept at a predetermined small constant value for generating a required minimum pump discharge pressure (supplying the pump discharge amount) while Pw is maintained or reduced, expect for being set to a predetermined large constant value while Pw is increased. In the present embodiment, the pressure adjustment valve 27 is configured as the proportional control valve, which makes fine control possible, thereby realizing smooth control of Pw. Controlling the cut valve 21 in the valve-closing direction and blocking the communication between the master cylinder 5 side and the wheel cylinder 8 side facilitates the control of Pw independent of the brake operation performed by the driver.

The wheel cylinder hydraulic control unit 104 basically performs the boosting control at the time of normal brake, in which the braking force is generated on the front and wheel wheels FL to RR according to the brake operation performed by the driver. The wheel cylinder hydraulic control unit 104 controls the SOL/V IN 25 in the valve-opening direction and the SOL/V OUT 28 in the valve-closing direction for each of the wheel FL to RR at the time of the normal boosting control. The wheel cylinder hydraulic control unit 104 controls the pressure adjustment valve 27 in the valve-closing direction (performs the feedback control on the opening degree and/or the like), controls the communication valve 26 in the valve-opening direction, and activates the pump 7 while setting the instruction value Nm* for the number of rotations of the motor 7a to a predetermined constant value, with the cut valves 21P and 21S controlled in the valve-closing direction. The wheel cylinder hydraulic control unit 104 activates the SS/V OUT 24 in the valve-opening direction (controls the SS/V OUT 24 in the valve-opening direction) and activates the SS/V IN 23 in the valve-closing direction (controls the SS/V IN 23 in the valve-closing direction).

The wheel cylinder hydraulic control unit 104 includes an assist pressure increase control unit 105. The assist pressure increase control is control for supplying the brake fluid flowing out of the backpressure chamber R2 of the stroke simulator 22 to the wheel cylinder 8 according to the brake operation performed by the driver, thereby assisting the generation of the wheel cylinder hydraulic pressure Pw using the pump 7, thus improving responsiveness of the increase in the pressure in the wheel cylinder 8. The assist pressure increase control is positioned as assist (backup) control for the control for increasing the pressure in the wheel cylinder with use of the pump 7. The assist pressure increase control unit 105 performs the assist pressure increase control according to a state of the brake operation performed by the driver when increasing Pw at each of the wheels FL to RR (performing the control for increasing the pressure in the wheel cylinder with use of the pump 7)

according to the driver's operation of pressing the brake pedal 2 (the increase in the pedal stroke Sp) at the time of the boosting control by the wheel cylinder hydraulic control unit 104 (the normal brake). More specifically, the assist pressure increase control unit 105 deactivates the SS/V IN 23 (controls the SS/V IN 23 in the valve-opening direction) and deactivates the SS/V OUT 24 (controls the SS/V OUT 24 in the valve-closing direction). A content of control of the other actuators, such as activating the pump 7, is similar to the content at the time of the normal boosting control.

The assist pressure increase control unit 105 determines whether the state of the brake operation performed by the driver is a predetermined sudden brake operation, and allows the assist pressure increase control to be performed if determining that the sudden brake operation is performed (the brake pedal 2 is pressed at a high speed). The assist pressure increase control unit 105 does not perform the assist pressure increase control if determining that the sudden brake operation is not performed (the brake pedal 2 is not pressed at a high speed). More specifically, the assist pressure increase control unit 105 determines that the above-described predetermined sudden brake operation is performed if the brake operation speed (the pedal stroke speed $\Delta Sp/\Delta t$) detected or estimated by the brake operation state detection unit 101 is a predetermined value a (a threshold value for determining whether to start or end the assist pressure increase control) or higher, and determines that the above-described predetermined sudden brake operation is not performed if $\Delta Sp/\Delta t$ is lower than a. When determining that the sudden brake operation is performed, the assist pressure increase control unit 105 performs the assist pressure increase control as described above if the number Nm of rotations of the motor 7$a$ detected or estimated based on the signal detected by the resolver is a predetermined value Nm0 (a threshold value for determining to end the assist pressure increase control) or smaller and the detected pedal stroke Sp is a predetermined value Sp0 (a threshold value for determining to end the assist pressure increase control) or smaller. On the other hand, even when determining that the sudden brake operation is performed, the assist pressure increase control unit 105 determines that a condition for ending the assist pressure increase control is satisfied and does not perform the assist pressure increase control if Nm is larger than Nm0 or Sp is larger than Sp0. In this case, the wheel cylinder hydraulic control unit 104 controls the SS/V IN 23 in the valve-closing direction and the SS/V OUT 24 in the valve-opening direction, thereby performing the normal boosting control (the control for increasing the pressure in the wheel cylinder with use of the pump 7). As a result, the assist pressure increase control is ended.

Effects

Next, effects will be described. When performing the normal control for increasing the pressure in the wheel cylinder with use of the pump 7, the apparatus 1 controls the SS/V OUT 24 in the valve-opening direction and the SS/V IN 23 in the valve-closing direction. As a result, the communication between the backpressure chamber R2 of the stroke simulator 22 and the intake oil passage 15 (the reservoir tank 4) is established, and the communication between the backpressure chamber R2 and the first oil passage (the wheel cylinder 8) is blocked. The brake fluid flowing out of the backpressure chamber R2 is discharged into the reservoir tank 4 via the fourth oil passage 14. On the other hand, the brake fluid discharged from the pump 7 flows into the first oil passage 11 (11B) via the discharge oil passage 16. The pressure in each of the wheel cylinders 8 is increased by the inflow of this brake fluid into each of the wheel cylinders 8. In other words, the apparatus 1 increases the pressure in the wheel cylinder 8 with use of the hydraulic pressure generated in the first oil passage 11 with use of the pump 7. Further, the pedal reaction force is generated by the force (F2+F3) with which the spring 221 and the backpressure P2 of the stroke simulator 22 (the hydraulic pressure close to the atmospheric pressure on the reservoir tank 4 side) press the piston 220.

If there is a possibility that the responsiveness of the increase in the pressure in the wheel cylinder 8 using the pump 7 may become insufficient, the apparatus 1 performs the assist pressure increase control using the operation of pressing the brake pedal 2 in addition to the normal control for increasing the pressure in the wheel cylinder with use of the pump 7. When performing the assist pressure increase control, the apparatus 1 controls the SS/V OUT 24 in the valve-closing direction and the SS/V IN 23 in the valve-opening direction. As a result, the communication between the backpressure chamber R2 of the stroke simulator 22 and the intake oil passage 15 (the reservoir tank 4) is blocked, and the communication between the backpressure chamber R2 and the first oil passage 11P is established. Since each of the communication valves 26P and 26S is controlled in the valve-opening direction, the backpressure chamber R2 is brought into communication with each of the wheel cylinders 8. The brake fluid flowing out of the backpressure chamber R2 is delivered into the first oil passage 11 via the third oil passage 13. The pressure in each of the wheel cylinders 8 is increased by the inflow of this brake fluid into each of the wheel cylinders 8. In other words, the apparatus 1 increases the pressure in the wheel cylinder 8 by supplying the brake fluid flowing out of the backpressure chamber R2 of the stroke simulator 22 activated by the pressing force Fp exerted by the driver into the first oil passage 11 (11B) via the third oil passage 13. This increase assists the generation of the hydraulic pressure in the wheel cylinder 8 using the pump 7. Further, the pedal reaction force is generated by the force (F2+F3) with which the spring 221 and the backpressure P2 (the hydraulic pressure close to the hydraulic pressure Pw on the wheel cylinder 8 side) press the piston 220.

The satisfaction with a predetermined condition makes sufficient the responsiveness of the increase in the pressure using the pump 7, allowing the wheel cylinder hydraulic pressure Pw to be increased to a higher value than the master cylinder hydraulic pressure Pm with use of the pump (the boosting control), and increased at a higher speed than Pm. Therefore, the apparatus 1 ends the assist pressure increase control, and performs only the normal control for increasing the pressure in the wheel cylinder with use of the pump 7. At the time of the end of the assist pressure increase control, the apparatus 1 controls the SS/V OUT 24 in the valve-opening direction and the SS/V IN 23 in the valve-closing direction. As a result, the above-described flow passage of the brake fluid flowing out of the backpressure chamber R2 according to the brake operation performed by the driver is switched from the flow passage heading toward the first oil passage (11B) via the third oil passage 13 to the flow passage heading toward the intake oil passage 15 (the reservoir tank 4) via the fourth oil passage 14. In this manner, the SS/V OUT 24 and the SS/V IN 23 form a flow passage switching unit that switches the above-described flow passage.

The insufficiency of the responsiveness of the increase in the pressure in the wheel cylinder 8 using the pump 7 becomes noticeable when the state of the brake operation performed by the driver is the sudden brake operation, i.e., the brake operation speed is high and it becomes difficult for the pump 7 to increase the pressure in the wheel cylinder 8 while keeping up with this high-speed brake operation. For example, while the actual value Nm cannot follow the instruction value Nm* for the number of rotations of the motor due to a delay in the control (a delay in a response of the control) of the motor 7a, which is the actuator regarding the pump 7, the number of rotations of the pump 7 becomes insufficient and therefore the wheel cylinder hydraulic pressure Pw does not reach the target hydraulic pressure Pw*. Therefore, the apparatus 1 can effectively improve the responsiveness of the increase in the pressure in the wheel cylinder 8 by allowing the assist pressure increase control to be performed in such a case. More specifically, the apparatus 1 allows the assist pressure increase control to be performed if the state of the brake operation performed by the driver is the predetermined sudden brake operation, and performs the normal control for increasing the pressure in the wheel cylinder with use of the pump 7 if the state of the brake operation performed by the driver is not the predetermined sudden brake operation. Then, a configuration for detecting or estimating the brake operation speed is required to determine whether the state of the brake operation performed by the driver is the sudden brake operation. One possible configuration therefor is to detect or estimate a change (a speed of the change) in the hydraulic pressure at a predetermined portion in the hydraulic control unit 6, and detect or estimate the brake operation speed based thereon. However, generally, a backlash is set at the brake pedal (a brake operation member) and/or the like, and, further, it takes a predetermined time for the hydraulic pressure to be transmitted to each portion with respect to the displacement of the brake pedal. This leads to such a characteristic that the displacement of the brake pedal appears (as the sensor value) earlier than the hydraulic pressure (the change therein). This characteristic becomes noticeable especially at the time of the sudden brake operation. In the present embodiment, the apparatus 1 detects or estimates the brake operation speed based on the displacement (Sp) of the brake pedal 2 instead of the change in the hydraulic pressure, and therefore can determine whether there is the sudden brake operation further early (swiftly). Therefore, the apparatus 1 can further effectively improve the responsiveness of the increase in the pressure in the wheel cylinder 8.

Further, the insufficiently of the responsiveness in the increase in the pressure in the wheel cylinder 8 using the pump 7 becomes noticeable when the capability of the pump 7 for supplying the brake fluid to the wheel cylinder 8 is still insufficient, in particular, the number Nm of rotations of the motor 7a is small. In the present embodiment, the apparatus 1 can effectively improve the responsiveness of the increase in the pressure in the wheel cylinder 8 by allowing the assist pressure increase control to be performed in such a case. More specifically, the apparatus 1 allows the assist pressure increase control to be performed when detected or estimated Nm is the predetermined value Nm0 or smaller. The above-described predetermined value Nm0 can be set to such a value that the pump 7 attains the capability for supplying the brake fluid (pressure) enough to sufficiently increase the pressure in the wheel cylinder 8. For example, the predetermined value Nm0 is set to such a number of rotations that the hydraulic pressure equal to or higher than the backpressure P2 (corresponding to the master cylinder hydraulic pressure Pm) can be generated by the brake fluid amount discharged from the pump 7. Especially, when the driver starts the operation of pressing the brake pedal, i.e., the pedal stroke Sp is increasing from zero, the motor 7a should be driven from a stopped state and the number of rotations Nm should be increased. However, even when the instruction value Nm* for the number of rotations of the motor is increased, the actual number Nm of rotations of the motor starts increasing while falling behind the increase in the instruction value Nm*. Such a delay (a time lag) in the response of the control highly likely results in the insufficiently of the capability of the pump 7 for performing the control for increasing the pressure in the wheel cylinder. The apparatus 1 can effectively improve the responsiveness of the increase in the pressure in the wheel cylinder 8 by increasing the pressure in the wheel cylinder 8 by the assist pressure increase control when the capability of the pump 7 for supplying the brake fluid (pressure) is still insufficient in this manner. The apparatus 1 may use a condition that an elapsed time period (a timer) since the increase in Nm* (according to the operation of pressing the brake pedal) is a predetermined value or shorter, instead of the above-described condition that Nm is Nm0 or smaller. More specifically, the apparatus 1 performs the assist pressure increase control when the above-described elapsed time period is the predetermined value or shorter (ends the assist pressure increase control when the above-described elapsed time period exceeds the predetermined value). This predetermined value of the timer is set to a time period required for the pump 7 to attain the sufficient supply capability (for example, Nm increases to reach or exceed the number of rotations that allows the pump 7 to generate the hydraulic pressure equal to or higher than P2 corresponding to Pm). This predetermined value can be predetermined from an experiment or the like in consideration of, for example, a time period of the delay in the control of the motor 7a.

Further, generally, a brake fluid amount Qw supplied toward the wheel cylinder and the wheel cylinder hydraulic pressure Pw have such a relationship therebetween that $\Delta PW \Delta Qw$ (the fluid stiffness), which is an amount of the increase in the wheel cylinder hydraulic pressure Pw with respect to the increase in the fluid amount Qw, is small in a predetermined low pressure region, and is large in a non-low pressure region corresponding to a higher pressure than the above-described predetermined region. In the above-described low pressure region, Pw is still small and therefore the increase in Pw requires only a weak force but requires large Qw. On the other hand, in the above-described non-low pressure region, Pw is generated to some degree and therefore the increase in Pw requires only small Qw but requires a strong force. Then, the insufficiency of the responsiveness of the increase in the pressure in the wheel cylinder using the pump 7 becomes noticeable in the above-described low pressure region. In the present embodiment, the apparatus 1 can effectively improve the responsiveness of the increase in the pressure in the wheel cylinder 8 by allowing the assist pressure increase control to be performed in such a low pressure region.

More specifically, the apparatus 1 allows the assist pressure increase control to be performed when the detected pedal stroke Sp is the predetermined value Sp0 or smaller. In other words, in the assist pressure increase control, the brake fluid is supplied toward the wheel cylinder 8 by an amount corresponding to the stroke amount of the piston 52P of the master cylinder 5 (the piston 220 of the stroke simulator 22). In the low pressure region where Sp is Sp0 or smaller, the increase in the wheel cylinder hydraulic pressure Pw requires only a relatively weak force, whereby Pw can be increased sufficiently by the pressing force Fp. Therefore, the apparatus 1 can improve the responsiveness of the increase in the pressure in the wheel cylinder 8. The above-described low pressure region and non-low pressure region, and the above-described predetermined value Sp0 for discriminating them can be preset from an experiment or the like. Especially, when the operation of pressing the brake pedal is started, i.e., when Sp increases from zero is equal to when Pw increases from zero, and corresponds to the above-described low pressure region. In other words, Pw is still low, and the increase in Pw requires large Qw. The apparatus 1 can effectively improve the responsiveness of the increase in the pressure in the wheel cylinder 8 by performing the assist pressure increase control in such a situation. In other words, the apparatus 1 increases the pressure in the wheel cylinder 8 with use of the pump 7 capable of generating the hydraulic pressure with a stronger force than the pressing force Fp in the above-described non-low pressure region where the fluid stiffness is high and the increase in Pw requires a strong force (although requires only small Qw). This operation allows Pw to be controlled to, for example, P2 (corresponding to Pm) or a higher value.

The apparatus 1 may be configured to determine whether the brake operation is in the above-described low pressure region or the above-described non-low pressure region based on the wheel cylinder hydraulic pressure Pw detected by the hydraulic sensor 92 instead of the detected pedal stroke Sp. The apparatus 1 can more correctly determine whether the brake operation is in the above-described low pressure region or the above-described non-low pressure region by directly referring to Pw in this manner, than by referring to Sp (the brake operation amount) (or the apparatus 1 may be configured to estimate Pw). More specifically, the apparatus 1 allows the assist pressure increase control to be performed when detected or estimated Pw is the predetermined value or lower, and performs the normal control for increasing the pressure in the wheel cylinder with use of the pump 7 when detected or estimated Pw is higher than the predetermined value Pw0. The apparatus 1 can achieve a similar effect to the above-described effect by using a threshold value separating the above-described low pressure region and the above-described non-low pressure region as the above-described predetermined value Pw0. On the other hand, in the present embodiment, the apparatus 1 can determine whether the brake operation is in the above-described low pressure region or the above-described non-low pressure region earlier (more swiftly) by being configured to make this determination based on detected Sp, than by making the determination based on detected or estimated Pw. This is because Sp appears as the sensor value earlier than the hydraulic pressure Pw (the change therein) as described above. As a result, the apparatus 1 can effectively improve the responsiveness of the increase in the pressure in the wheel cylinder 8. Some difference may occur between the individual time points when the assist pressure increase control is determined to be ended, i.e., the time point when ΔSp/Δt falls below a, the time point when Sp exceeds Sp0, and the time point when Nm exceeds Nm0, but the occurrence of the difference is accepted. These values such as a may be adjusted based on an experiment or a simulation so as to reduce the difference between these time points. Further, any one or two of the values such as a set as the threshold values for determining to end the assist pressure increase control may be omitted. In a case Nm0 and/or Sp0 are omitted, a as the threshold value for determining to start the assist pressure increase control and a as the threshold value for determining to end the assist pressure increase control may be prepared separately (a may be set so as to have hysteresis) with an attempt to prevent or reduce hunting of the control.

Next, the effects of the apparatus 1 will be described in comparison with the conventional technique. Conventionally, there has been known the brake apparatus capable of blocking the communication between the master cylinder and the wheel cylinder, including the mechanism (the stroke simulator) capable of simulating the pedal reaction force other than the wheel cylinder, and capable of increasing the pressure in the wheel cylinder with use of the hydraulic source other than the master cylinder. Such an apparatus blocks the communication between the master cylinder and the wheel cylinder, and increases the pressure in the wheel cylinder with use of the hydraulic source while creating the pedal reaction force with use of the stroke simulator at normal times. Then, it is desirable to satisfy the sufficient responsiveness of the increase in the pressure in the wheel cylinder using the hydraulic pressure, assuming that the pressure in the wheel cylinder may have to be increased rapidly in some cases, such as when the driver performs the brake operation rapidly. However, for this satisfaction, the conventional brake apparatus requires the improvement of the capability of the actuator regarding the hydraulic source, raising a possibility of increases in the size and the cost of the actuator.

On the other hand, the apparatus 1 according to the present embodiment is configured to be able to supply the brake fluid to the wheel cylinder 8 with use of the stroke simulator 22 (activated according to the brake operation performed by the driver for simulating the pedal reaction force) independently of the pump 7 as the hydraulic source to improve the responsiveness of the increase in the pressure in the wheel cylinder 8. More specifically, in the stroke simulator 22, the brake fluid is discharged from the back-pressure chamber R2 on a different side from one side where the brake fluid flows in from the master cylinder 5 when the driver performs the operation of pressing the brake pedal. The apparatus 1 is configured to be able to increase the pressure in the wheel cylinder 8 by allowing this brake fluid to be supplied toward the wheel cylinder 8. Therefore, the apparatus 1 can improve the responsiveness of the increase in the pressure in the wheel cylinder 8 even when the pressure in the wheel cylinder 8 is expected to be increased with use of the pump 7 at an insufficient speed (with insufficient responsiveness). In other words, the apparatus 1 eliminates the necessity of increasing the size and the cost of the motor 7a to improve the capability of the motor 7a as the actuator regarding the pump 7. The apparatus 1 can prevent or cut down, for example, the increase in the size of the motor 7a while improving the responsiveness of the increase in the pressure in the wheel cylinder 8, by using the brake fluid discharged from the stroke simulator 22 due to the application of the brake operation force exerted by the driver (the brake fluid supplied independently of the pump 7) in this manner. Therefore, the apparatus 1 can be improved in mountability onto the vehicle and layout flexibility. In the present embodiment, the apparatus 1 uses the pump 7 as the hydraulic source and the motor 7a (the rotational electric machine) as the actuator regarding the hydraulic source, but the hydraulic source may be any fluid mechanism capable of generating the brake hydraulic pressure by converting mechanical energy (motive power) into the brake hydraulic pressure, and maintaining the generated brake hydraulic pressure. For example, the hydraulic source may be embodied with use of a piston cylinder, an accumulator, or the like, and is not limited to a pump. Further, the actuator may be any mechanism (an electric machine) capable of converting input electric energy (electric power) into a physical motion (motive power) to activate the hydraulic source, and is not limited to a motor (the rotational electric machine).

In the present embodiment, the apparatus 1 includes the third oil passage 13 in the hydraulic control unit 6 (the second unit 62) to cause the brake fluid discharged from the stroke simulator 22 to be supplied toward the wheel cylinder 8. The apparatus 1 can realize the above-described function only by additionally including a single third oil passage 13 in this manner, thereby succeeding in preventing or cutting down the increase in the size of the apparatus 1 and complication of the apparatus 1. In the present embodiment, the third oil passage 13 is directly connected to the portion in the first oil passage 11 between the cut valve 21 and the wheel cylinder (the oil passage 11B), but may be indirectly connected thereto. For example, the third oil passage 13 may be connected to the discharge oil passage 16.

The SS/V IN 23 is provided in the third oil passage 13. The SS/V IN 23 forms the above-described flow passage switching unit (a part thereof). The apparatus 1 switches the communication state of the third oil passage 13 by controlling the activation state of the SS/V IN 23. By this switching, the apparatus 1 switches whether to supply the brake fluid from the backpressure chamber R2 to the wheel cylinder 8, and therefore can arbitrarily switch whether to perform the assist pressure increase control. In other words, the apparatus 1 blocks the communication between the backpressure chamber R2 and the first oil passage 11P (11B) by controlling the SS/V IN 23 in the valve-closing direction, thereby prohibiting the brake fluid flowing out of the backpressure chamber R2 from being used for the assist pressure increase control. By this prohibition, the apparatus 1 can refrain from performing (can end) the assist pressure increase control. Conversely, the apparatus 1 establishes the communication between the backpressure chamber R2 and the first oil passage 11P (11B) by controlling the SS/V IN 23 in the valve-opening direction, thereby permitting the brake fluid flowing out of the backpressure chamber R2 to be used for the assist pressure increase control. By this permission, the apparatus 1 can perform the assist pressure increase control. The SS/V IN 23 may be a normally-closed valve.

The SS/V OUT 24 is provided in the fourth oil passage 14. The apparatus 1 switches the communication state of the fourth oil passage 14 by controlling the activation state of the SS/V OUT 24. By this switching, the apparatus 1 can arbitrarily switch whether to activate the stroke simulator 22. More specifically, the apparatus 1 establishes the communication between the backpressure chamber R2 and the reservoir tank 4 side by controlling the SS/V OUT 24 in the valve-opening direction, thereby causing the brake fluid to flow out of the backpressure chamber R2 to the reservoir tank 4 side. As a result, the apparatus 1 can allow the piston 220 to be stroked and set the stroke simulator 22 into an activated state. On the other hand, the apparatus 1 blocks the communication between the backpressure chamber R2 and the intake oil passage 15 (the reservoir tank 4) by controlling the SS/V OUT 24 in the valve-closing direction, thereby prohibiting or reducing the outflow of the brake fluid from the backpressure chamber R2 into the reservoir tank 4. By this prohibition or reduction, the apparatus 1 can prohibit or reduce the stroke of the piston 220, thereby setting the stroke simulator 22 into a deactivated state. Therefore, at the time of the pressing force brake, the apparatus 1 can prohibit or reduce the displacement of the piston 220 of the stroke simulator 22 against the driver's operation of pressing the brake pedal and efficiently supply the brake fluid from the master cylinder 5 to the wheel cylinder 8. Therefore, the apparatus 1 can prevent or cut down the reduction in the wheel cylinder hydraulic pressure Pw generated by the driver with the brake operation. Further, when a failure has occurred in the apparatus 1, closing the SS/V OUT 24 can set the stroke simulator 22 into the deactivated state, thereby preventing or cutting down the reduction in Pw generated from the pressing force brake (the pressing force Fp). In the present embodiment, the SS/V OUT 24 is configured as the normally-closed valve. Therefore, the above-described advantageous effect can be achieved by closing the SS/V OUT 24 at the time of a power failure. The cut valve 21 is configured as the normally-opened valve and the communication valve 26 is configured as the normally-closed valve, which make the brake hydraulic systems of the two systems operable independently of each other even when the power failure has occurred, allowing both the systems to increase the pressure in the wheel cylinder from the pressing force Fp separately from each other. Therefore, a fail-safe performance can be improved.

Further, the SS/V OUT 24 forms the above-described flow passage switching unit (a part thereof). The apparatus 1 switches the communication state of the fourth oil passage 14 by controlling the activation state of the SS/V OUT 24, and therefore can further easily perform the assist pressure increase control. More specifically, the apparatus 1 blocks the communication between the backpressure chamber R2 and the reservoir tank 4 by controlling the SS/V OUT 24 in the valve-closing direction, thereby succeeding in allowing a further larger amount of the brake fluid flowing out of the backpressure chamber R2 to be used for the assist pressure increase control. Conversely, the apparatus 1 establishes the communication between the backpressure chamber R2 and the reservoir tank 4 by controlling the SS/V OUT 24 in the valve-opening direction, thereby succeeding in reducing the brake fluid flowing out of the backpressure chamber R2 for the assist pressure increase control.

The apparatus 1 can easily perform the assist pressure increase control by switching the activation states of the SS/V OUT 24 and the SS/V IN 23. More specifically, by appropriately controlling a combination of the activation of the SS/V OUT 24 and the activation of the SS/V IN 23, the apparatus 1 can easily switch the state in which the stroke simulator 22 is activated simply to create the pedal reaction force (the control for increasing the pressure in the wheel cylinder with use of only the pump 7), and the state in which the stroke simulator 22 is activated to (also) improve the responsiveness of the increase in the pressure in the wheel cylinder (the assist pressure increase control). More specifically, the apparatus 1 can prohibit or reduce the inflow of the brake fluid from the first oil passage 11 side to the backpressure chamber R2 side, and the application of a relatively high hydraulic pressure on the first oil passage 11 side to the backpressure chamber R2 by closing the SS/V IN 23 when opening the SS/V OUT 24. As a result, the apparatus 1 can smoothly activate the stroke simulator 22. The apparatus 1 prohibits or reduces the discharge of the brake fluid discharged from the backpressure chamber R2 to the reservoir tank 4 side by closing the SS/V OUT 24 when opening the SS/V IN 23. As a result, the apparatus 1 can improve the responsiveness of the increase in the pressure in the wheel cylinder 8 by increasing the brake fluid amount to be supplied from the backpressure chamber R2 to the wheel cylinder 8 side via the first oil passage 11.

The bypass oil passage 130 and the check valve 230 are provided in parallel with the third oil passage 13 while bypassing the SS/V IN 23. Therefore, the apparatus 1 can improve the responsiveness of the increase in the pressure in the wheel cylinder 8 at the time of the assist pressure increase control. More specifically, the check valve 230 is kept in the valve-opened state as long as the hydraulic pressure P2 on the backpressure chamber R2 side with respect to the check valve 230 (the oil passage 13A) is higher than the hydraulic pressure Pw on the first oil passage 11 side (the oil passage 13B). Therefore, the brake fluid is supplied from the backpressure chamber R2 side (the oil passage 13A) to the wheel cylinder 8 side (the oil passage 13B) via the bypass oil passage 130 regardless of the activation state of the SS/V IN 23. For example, even if the apparatus 1 is configured to control the SS/V IN 23 in the valve-closing direction before the start of the assist pressure increase control (for example, as a preparation for the boosting control), and the SS/V IN 23 is opened late due to the delay in the control when the assist pressure increase control is started, the apparatus 1 can supply the brake fluid from the backpressure chamber R2 toward the wheel cylinder 8 via the bypass oil passage 130. Further, because a flow area can be widened as much as the bypass oil passage 130 in addition to the third oil passage 13 during the assist pressure increase control, the apparatus 1 can increase the brake fluid amount supplied toward the wheel cylinder 8. Further, even if the SS/V IN 23 is closed with the pump 7 still failing to attain the sufficient capability for supplying the brake fluid (pressure) when the assist pressure increase control is ended (i.e., the SS/V IN 23 is closed at a too early timing), the apparatus 1 can supply the brake fluid from the backpressure chamber R2 toward the wheel cylinder 8 via the bypass oil passage 130 as long as P2 is higher than Pw. The check valve 230 is automatically closed (the bypass oil passage 130 is closed) when Pw reaches or exceeds P2, which can avoid a reverse flow of the brake fluid from the first oil passage 11 side (the oil passage 13B) to the backpressure chamber R2 side (the oil passage 13A) via the bypass oil passage 130.

The bypass oil passage 140 and the check valve 240 are provided in parallel with the fourth oil passage 14 while bypassing the SS/V OUT 24. This configuration allows the driver to easily return the pressed brake pedal 2 during the brake-by-wire control (including the boosting control). More specifically, the apparatus 1 can return the brake fluid from the reservoir tank 4 (the intake oil passage 15) side to the backpressure chamber R2 side (the oil passage 13A) via the bypass oil passage 140 regardless of the activation state of the SS/V OUT 24. The inflow of the brake fluid into the backpressure chamber R2 causes the stroke of the piston 220 in the direction for increasing the volume of the backpressure chamber R2 and also causes the stroke of the piston 52P of the master cylinder 5 in the direction for reducing the pedal stroke Sp. Therefore, the apparatus 1 can allow the driver to return the pressed brake pedal 2 swiftly regardless of, for example, the delay in the control of the SS/V OUT 24. Further, even if a failure (the power failure or the like) has occurred while the brake pedal 2 is being pressed (while the stroke simulator 22 is in operation) and the SS/V OUT 24 is stuck in the valve-closed state, the apparatus 1 can return the brake fluid from the reservoir tank 4 side to the backpressure chamber R2 via the bypass oil passage 140 according to the return of the pressed brake pedal 2. Therefore, even when the above-described failure has occurred, the apparatus 1 can allow the user to return the pressed brake pedal 2 to an initial position thereof while returning the stroke simulator 22 to an initial actuation position thereof.

The orifice portion 24A is provided in the fourth oil passage 14. A portion of the fourth oil passage 14 that is connected to the bypass oil passage 140 is not located between the SS/V OUT 24 (the valve body thereof) and the orifice portion 24A but is located on the opposite side of the orifice portion 24A from the SS/V OUT 24 (the valve body thereof). More specifically, one end of the bypass oil passage 140 is not connected to the SS/V OUT 24 (the valve body thereof) side but is connected to the intake oil passage 15 (the reservoir tank 4) side with respect to the orifice portion 24A. Therefore, the flow amount is not restricted by the orifice portion 24A in the flow passage of the brake fluid via the bypass oil passage 140, which allows the brake fluid to be further smoothly supplied from the reservoir tank 4 (the intake oil passage 15) side to the backpressure chamber R2 side (the oil passage 13A). Even if the apparatus 1 is configured to control the SS/V OUT 24 in the valve-opening direction before the start of the assist pressure increase control (for example, as a preparation for the boosting control) and the SS/V OUT 24 is closed late due to the delay in the control when the assist pressure increase control is started, the outflow of the brake fluid from the backpressure chamber R2 to the reservoir tank 4 side via the fourth oil passage 14 is restricted by the orifice portion 24A. Therefore, the apparatus 1 can improve the responsiveness of the increase in the pressure in the wheel cylinder 8 at the time of the assist pressure increase control.

When the anti-lock control is activated during the wheel cylinder hydraulic control (the brake-by-wire control) accompanying the brake operation, the apparatus 1 can make the driver aware of the activation of the anti-lock control by controlling the SS/V OUT 24 and the SS/V IN 23. More specifically, the wheel cylinder hydraulic control unit 104 includes the anti-lock control unit 106. The anti-lock control unit 106 intervenes in the hydraulic control (the boosting control) accompanying the brake operation upon detecting a lock tendency of some wheel. The apparatus 1 controls the opening/closing of the SOL/V IN 25 and the SOL/V OUT 28 corresponding to the wheel cylinder 8 at the wheel slipping by an excessive amount, with the pump 7 kept activated and the cut valve 21 kept controlled in the valve-closing direction. The apparatus 1 performs the control for increasing or reducing the hydraulic pressure in this wheel cylinder 8 by this operation, thereby allowing the slip amount of this wheel to reduce to an appropriate predetermined value. Then, the apparatus 1 can appropriately control the pedal stroke Sp and the pedal reaction force Fp by appropriately controlling the operations of the SS/V OUT 24 and the SS/V IN 23 according to the activation state of the anti-lock control (according to a state of the control of the hydraulic pressure in each of the wheel cylinders 8). For example, the apparatus 1 controls the SS/V OUT 24 in the valve-closing direction and the SS/V IN 23 in the valve-opening direction when reducing the wheel cylinder hydraulic pressure Pw according to the actuation of the anti-lock control. By this control, the apparatus 1 causes the brake fluid to flow from the pump 7 side into the backpressure chamber R2 of the stroke simulator 22, thereby changing the position of the brake pedal 2 in a return direction. In this manner, the apparatus 1 can provide the strokes to the pistons 220 and 52P (control the position of the piston 52P) with use of the hydraulic pressure generated with use of the pump 7 by controlling each of the valves 24 and 23. For example, the apparatus 1 can also be configured to displace (vibrate) the brake pedal 2 forward and backward (in the return direction and an advance direction). Therefore, the apparatus 1 can realize a similar reaction of the brake pedal 2 to the conventional brake apparatus, i.e., the conventional apparatus configured in such a manner that the change in the hydraulic pressure in the wheel cylinder accompanying the actuation of the anti-lock control is transmitted to the master cylinder (the brake pedal). Therefore, the apparatus 1 can realize a pedal feeling that makes the driver less uncomfortable. In the present embodiment, the SS/V IN 23 is configured as the proportional control valve, whereby the apparatus 1 can further correctly control, for example, the position of the brake pedal 2.

Next, the pedal feeling when the assist pressure increase control is performed will be described. The SS/V OUT 24 is not disposed on the positive pressure chamber R1 side of the stroke simulator 22 (in the second oil passage 12) but is disposed on the backpressure chamber R2 side of the stroke simulator 22 (in the fourth oil passage 14), which contributes to improving the pedal feeling when the assist pressure increase control is ended. More specifically, hypothetically suppose that the SS/V OUT 24 is disposed on the positive pressure chamber R1 side (in the second oil passage 12). In this case, it is also conceivable to realize the assist pressure increase control by employing a control configuration that controls the above-described SS/V OUT 24 in the valve-closing direction and the cut valve 21 in the valve-opening direction to supply the brake fluid from the master cylinder 5 to the wheel cylinder 8. This case can also improve the responsiveness of the increase in the pressure in the wheel cylinder 8 by using the brake fluid supplied by the driver's operation of pressing the brake pedal (independently of the pump 7). This configuration leads to closing the cut valve 21 and opening the SS/V OUT 24 when ending the assist pressure increase control and shifting to the normal control for increasing the pressure in the wheel cylinder. However, the brake fluid is not supplied to the stroke simulator 22 and the stroke simulator is deactivated during the assist pressure increase control. Therefore, how much the stroke simulator 22 is activated (the stroke amount of the piston 220, i.e., the deformation amount of the spring 221) at the time of the above-described shift cannot correspond to the pedal stroke Sp at the time of the above-described shift. Therefore, a relationship between the pedal stroke Sp and the pressing force Fp (an F-S characteristic) at the time of the above-described shift becomes different from the relationship when the assist pressure increase control is not performed (at the time of the normal control). Further, the brake fluid amount left on the upstream side of the cut valve 21P and the positive pressure chamber R1 side (between the primary hydraulic chamber 51P of the master cylinder 5, the first oil passage 11P (the oil passage 11A) and the second oil passage 12, and the positive pressure chamber R1) after the above-described shift is smaller by an amount as much as the fluid amount supplied to the wheel cylinder 8 before the above-described shift, compared to when the normal control is performed. In other words, the fluid amount on the positive pressure chamber R1 side of the stroke simulator 22 fails to make ends meet between before and after the above-described shift, resulting in unevenness of the F-S characteristic. Therefore, this configuration may make the driver feel uncomfortable.

On the other hand, in the present embodiment, the piston 220 of the stroke simulator 22 continues the stroke as much as the brake fluid amount flowing out from the master cylinder 5 according to the operation of pressing the brake pedal throughout before and after the end of the assist pressure increase control. In other words, the brake fluid is continuously supplied to the stroke simulator 22 (the positive pressure chamber R1) not only during the normal control for increasing the pressure in the wheel cylinder with use of the pump 7 but also during the assist pressure increase control, keeping the stroke simulator activated. Therefore, how much the stoke simulator 22 is activated (the stroke amount of the piston 220, i.e., the compression amount of the spring 221) at the time of the end of the assist pressure increase control corresponds to the pedal stroke Sp at the time of the above-described end. Further, the brake fluid is confined between the primary hydraulic chamber 51P of the master cylinder 5, the first oil passage 11A and the second oil passage 12, and the positive pressure chamber R1 (between the pistons 51P and 52S of the master cylinder 5, the cut valve 21P, and the piston 220 of the stroke simulator 22) by an amount unchanged between before and after the above-described end. In other words, the fluid amount on the positive pressure chamber R1 side makes ends meet, which eliminates the possibility of the unevenness of the F-S characteristic between before and after the above-described end. Therefore, the apparatus 1 can realize the pedal feeling that makes the driver less uncomfortable. In other words, in the assist pressure increase control according to the present embodiment, the apparatus 1 only switches a supply destination of the brake fluid discharged from the stroke simulator 22 from the reservoir tank 4 to the wheel cylinder 8, so that the actuation of the stroke simulator 22 (the stroke of the piston 220) itself is not interrupted. The stroke simulator 22 can function as the brake fluid supply source that supplies the brake fluid to the wheel cylinder 8, and at the same time, can exert the originally intended function of simulating the pedal reaction force Fp. Therefore, the apparatus 1 can prevent or reduce the deterioration of the pedal feeling.

At the time of the assist pressure increase control, the hydraulic pressure P2 close to the wheel cylinder hydraulic pressure Pw is applied to the backpressure chamber R2 of the stroke simulator 22. Therefore, a stronger pressing force Fp is required to achieve the same pedal stroke Sp, compared to the normal control for increasing the pressure in the wheel cylinder in which the hydraulic pressure P2 close to the atmospheric pressure on the reservoir tank 4 side is applied to the backpressure chamber R2. Therefore, this means that the F-S characteristic is slightly changed compared to when the normal control for increasing the pressure in the wheel cylinder (the normal control) is performed. However, the assist pressure increase control is performed when the operation of pressing the brake pedal is performed (a dynamic situation where Fp and Sp are changing), whereby this unevenness of the characteristic can be accepted to some degree (it is relatively less likely that the control makes the driver feel uncomfortable). However, if the assist pressure increase control continues for an excessively long time period, this control may make the driver feel uncomfortable, deteriorating the pedal feeling. On the other hand, in the present embodiment, the apparatus 1 is configured in such a manner that the SS/V IN 23 is closed when the wheel cylinder 8, or the first oil passage 11 or the third oil passage 13 (the oil passage 13B) in communication therewith is brought into a predetermined state. More specifically, the apparatus 1 controls the SS/V IN 23 in the valve-closing direction when Nm exceeds Nm0 or Sp exceeds Sp0, i.e., the hydraulic pressure Pw in the wheel cylinder 8, or the oil passage 11 or 13B in communication therewith (corresponding to Pm) reaches or exceeds P2. By this control, the apparatus 1 can end the assist pressure increase control before the hydraulic pressure P2 applied to the backpressure chamber R2 excessively increases, thereby succeeding in effectively preventing or reducing the deterioration of the pedal feeling. The apparatus 1 may be configured to control the SS/V IN 23 in the valve-closing direction at the point before the above-described hydraulic pressure Pw (corresponding to Pm) reaches P2. In this case, the apparatus 1 can avoid the increase in the above-described hydraulic pressure Pw to higher than P2 before the SS/V IN 23 is closed (with the SS/V IN 23 kept opened) due to, for example, the delay in the control of the SS/V IN 23. Therefore, the apparatus 1 can further reliably prevent or reduce the deterioration of the pedal feeling. Further, an orifice portion may be provided in the third oil passage 13 in series with the SS/V IN 23. In this case, even when, for example, the above-described hydraulic pressure Pw exceeds P2 before the SS/V IN 23 is closed (with the SS/V IN 23 kept opened) due to, for example, the delay in the control of the SS/V IN 23, the provision of the above-described orifice portion can prohibit or reduce a return of the brake fluid from the first oil passage 11 side (the oil passage 13B) to the backpressure chamber R2 side (the oil passage 13A). Therefore, the apparatus 1 can further reliably prevent or reduce the deterioration of the pedal feeling.

Figure 2:
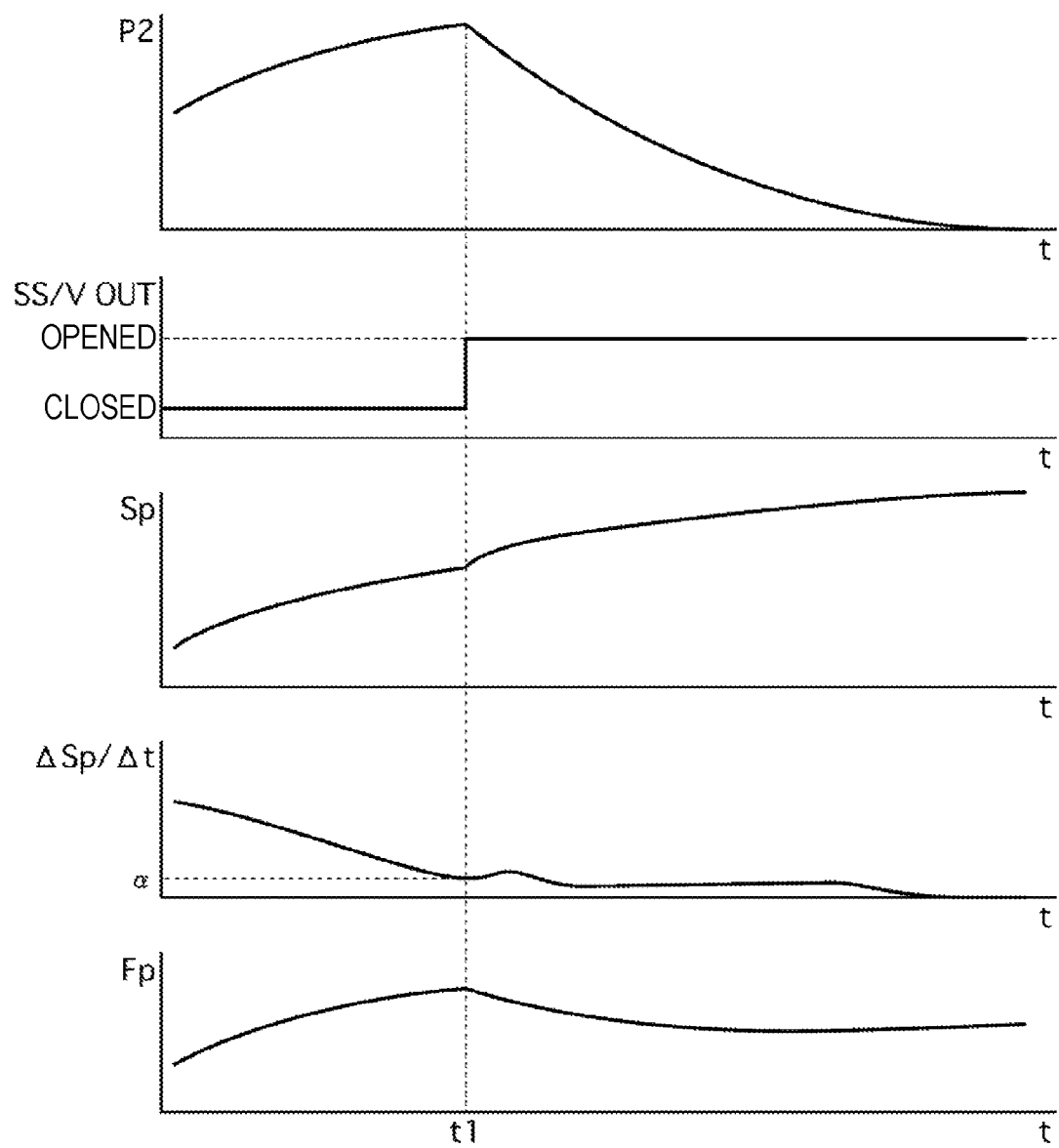
FIG. 2 is a timing chart when the brake apparatus according to the first embodiment ends assist pressure increase control and shifts to normal boosting control.

FIG. 2 is a timing chart illustrating how each of the parameters (variables) changes when the apparatus 1 performs the assist pressure increase control due to the driver's sudden brake operation and then ends the assist pressure increase control to shift to the normal boosting control. Because this timing chart is drawn based on an assumption that the vehicle is in the middle of the boosting control, the apparatus 1 controls the cut valve 21 in the valve-closing direction and activates the pump 7. The master cylinder hydraulic pressure Pm increases according to the increase in the pressing force Fp due to the operation of pressing the brake pedal. The hydraulic pressure P1 in the positive pressure chamber R1 of the stroke simulator 22 increases due to the increase in Pm (the hydraulic pressure in the primary hydraulic chamber 51P). As a result, the spring 221 is pressed and compressed to cause the stroke of the piston 220, by which the brake fluid is delivered from the master cylinder 5 (the primary hydraulic chamber 51P) into the positive pressure chamber R1. Therefore, the piston 52P of the master cylinder 5 is stroked, and the pedal stroke Sp increases. The fluid amount delivered into the positive pressure chamber R1 is an amount according to Sp (i.e., the strokes of the pistons 52P and 220), and the brake fluid flows out of the backpressure chamber R2 into the third oil passage 13 (the oil passage 13A) as much as this amount. The increase in Sp, i.e., the increase in the stroke amount of the piston 220 (the reduction in the volume of the backpressure chamber R2) affects the backpressure P2 so as to increase it. A speed of the rise of the backpressure P2 (a rate of the rise per unit time) increases as the pedal stroke speed $\Delta Sp/\Delta t$ increases, i.e., an amount of the increase in the stroke of the piston 220 per unit time (an amount Q1 of the reduction in the volume of the backpressure chamber R2 per unit time) increases. The outflow of the brake fluid from the third oil passage 13 (the oil passage 13A) via the SS/V OUT 24 or the SS/V IN 23 affects the backpressure P2 so as to reduce it. A speed of the reduction in the backpressure P2 (a rate of the reduction per unit time) increases as an amount Q2 of the outflow of the brake fluid from the third oil passage 13 (the oil passage 13A) via the SS/V OUT 24 or the SS/V IN 23 per unit time increases. The change in the backpressure P2 is reflected in the pedal feeling of the driver as the change in the master cylinder hydraulic pressure Pm (the hydraulic pressure in the primary hydraulic chamber 51P) that is caused due to the backpressure P2 serving as the reaction force, i.e., as the change in the pedal reaction force (the pressing force) Fp.

Before time t1, the driver performs the sudden brake operation, and increases the pressing force Fp. The pressing force Fp first increases at a high speed, and then the increase speed gradually slows down. According thereto, the pedal stroke Sp first increases at a high speed $\Delta Sp/\Delta t$, and then $\Delta Sp/\Delta t$ gradually slows down. Before time t1, $\Delta Sp/\Delta t$ is a or higher (and Nm is Nm0 or smaller and Sp is Sp0 or smaller), whereby the apparatus 1 performs the assist pressure increase control. The apparatus 1 controls the SS/V OUT 24 in the valve-closing direction and the SS/V IN 23 in the valve-opening direction. The brake fluid flows out of the third oil passage 13 (the oil passage 13A) toward the wheel cylinder 8 via the SS/V IN 23. After the brake operation is started, the actual value Nm of the number of rotations of the motor 7a starts increasing from zero after a delay of a predetermined time, but the actual value Nm is considerably short of the instruction value Nm*, whereby the brake fluid discharged from the pump 7 can cause only a small increase in the wheel cylinder hydraulic pressure Pw. At this point, a differential pressure $\Delta Pin$ between the hydraulic pressure Pw on the first oil passage 11P (the wheel cylinder 8) side of the SS/V IN 23 and the hydraulic pressure P2 on the oil passage 13B (the backpressure chamber R2) side is relatively large, whereby the outflow amount Q2 via the SS/V IN 23 (the amount of the brake fluid supplied to the wheel cylinder 8) is large to some degree. On the other hand, due to high $\Delta Sp/\Delta t$, the amount Q1 of the reduction in the volume of the backpressure chamber R2 exceeds Q2. Therefore, P2 increases, and the increase speed thereof is high. As time t1 is approaching, accumulation of the brake fluid amount supplied to the wheel cylinder 8 is increasing, and the brake fluid amount discharged from the pump 7 is also increasing, so that Pw can increase to some degree. Therefore, the differential pressure $\Delta Pin$ reduces to a relatively low pressure, so that the outflow amount Q2 reduces. On the other hand, as time t1 is approaching, $\Delta Sp/\Delta t$ reduces, so that the amount Q1 of the reduction in the volume of the backpressure chamber R2 reduces. However, Q1 still exceeds Q2. Therefore, P2 continues increasing, but the increase speed thereof is gradually slowing down.

At time t1, the driver ends the sudden brake operation, and attempts to keep the pressing force Fp constant after that. At time t1, $\Delta Sp/\Delta t$ falls below a (or Nm exceeds Nm0 or Sp exceeds Sp0), so that the apparatus 1 ends the assist pressure increase control, and performs the normal control for increasing the pressure in the wheel cylinder. The apparatus 1 controls the SS/V OUT 24 in the valve-opening direction and the SS/V IN 23 in the valve-closing direction. While the flow of the brake fluid through the third oil passage 13 via the SS/V IN 23 is restricted, the brake fluid starts flowing from the oil passage 13A toward the reservoir tank 4 via the SS/V OUT 24. After time t1, due to the outflow of the brake fluid from the oil passage 13A via the SS/V OUT 24, P2 reduces toward the hydraulic pressure on the reservoir tank 4 side (the atmospheric pressure). The pressing force (the pedal reaction force) Fp reduces toward its magnitude at the time of the normal boosting control according to the reduction in P2 toward the hydraulic pressure on the reservoir tank 4 side (the atmospheric pressure). In other words, the master cylinder hydraulic pressure Pm (F1) reduces according to the reduction in P2 (F2), and the pedal reaction force Fp reduces. Further, the pistons 220 and 52P are stroked as much as the outflow of the brake fluid from the oil passage 13A, so that the pedal stroke Sp slightly increases. The increase in F3 due to the increase in the stroke amount of the piston 220 (the compression amount of the spring 221) slightly alleviates the reduction in Pm (F1) (the reduction in the pedal reaction force Fp) due to the reduction in P2 (F2).

Figure 8:
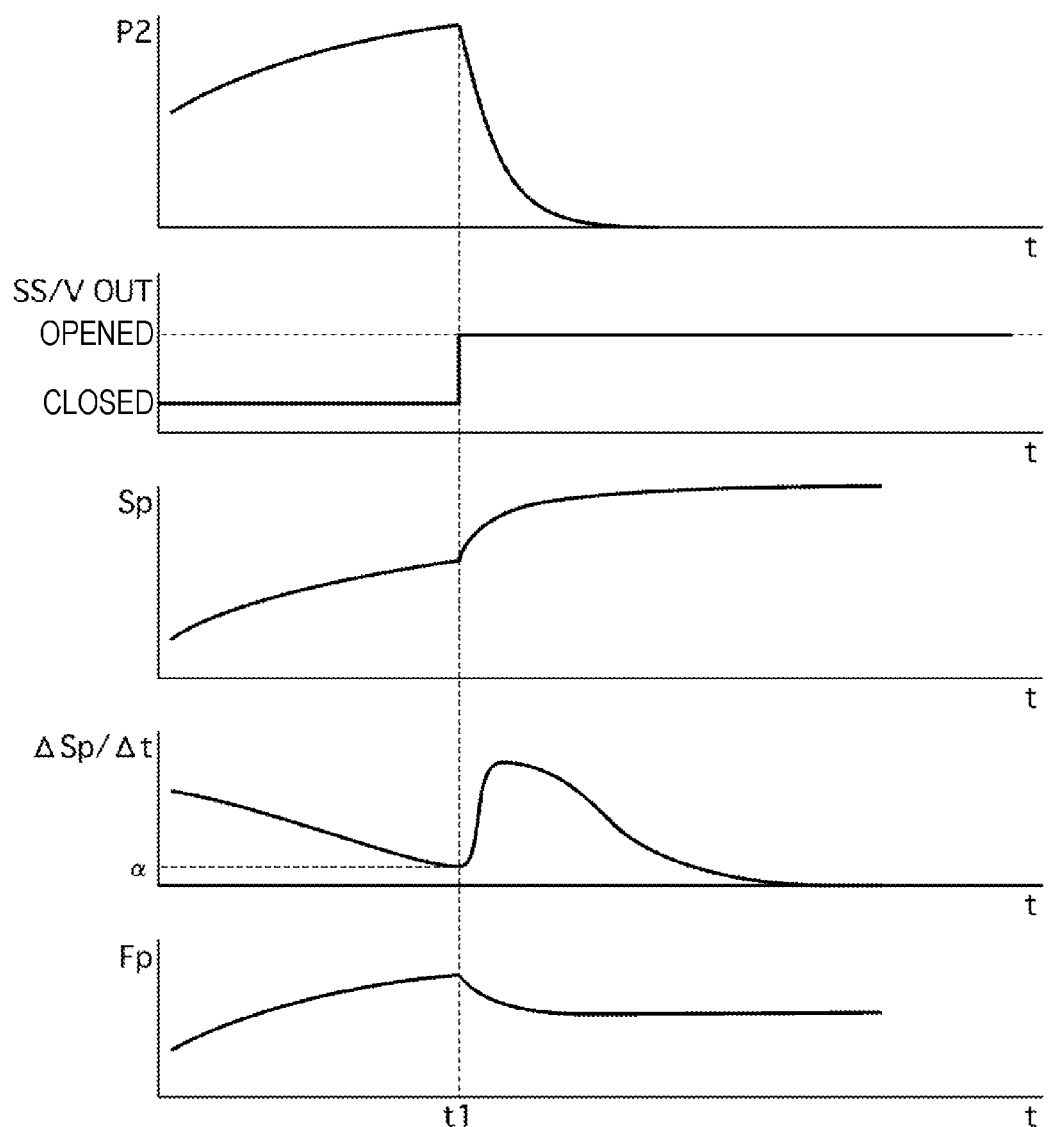
FIG. 8 is a timing chart when a brake apparatus according to a comparative example ends the assist pressure increase control and shifts to the normal boosting control.

In the above-described manner, the backpressure P2 takes a downturn after the (gentle) increase, since time t1 when the assist pressure increase control is ended. The sudden change in P2 causes the changes in the pedal reaction force Fp, the pedal stroke Sp, and the pedal stroke speed ΔSp/Δt, and the pedal feeling may be deteriorated due to that. FIG. 8 is a similar timing chart to FIG. 2 with respect to a brake apparatus according to a comparative example. The brake apparatus according to the comparative example is configured in a similar manner to the apparatus 1 according to the present embodiment except that the orifice portion 24A is not provided in the fourth oil passage 14 (the SS/V OUT 24). Since not including the orifice portion 24A, the brake apparatus according to the comparative example does not restrict the outflow amount Q2 of the brake fluid via the SS/V OUT 24 immediately after time t1. Therefore, the backpressure P2 reduces at a high speed, and P2 suddenly reduces in a short time. According thereto, the pressing force (the pedal reaction force) Fp reduces at a high speed, and Fp suddenly reduces in a short time. Further, because no restriction is imposed on the outflow amount Q2 of the brake fluid from the oil passage 13A (the backpressure chamber R2), the pistons 220 and 52P are stroked at a high speed, and Sp suddenly increases in a short time. According thereto, ΔSp/Δt largely changes. At this time, Q1 large enough to exceed Q2 is not generated. After time t1, even when ΔSp/Δt reaches or exceeds a again, the brake apparatus does not perform the assist pressure increase control (keeps the assist pressure increase control ended) because Nm is already larger than Nm0 or Sp is already larger than Sp0.

In this manner, according to the comparative example, when switching the flow passage from the backpressure chamber R2 to the intake oil passage 15 (the reservoir tank 4) after ending the assist pressure increase control, the brake apparatus may fail to generate the appropriate pedal feeling according to the operation performed on the brake pedal 2, thereby making the driver feel uncomfortable (feel as if the brake is not working). On the other hand, the apparatus 1 according to the present embodiment includes the orifice portion 24A in the fourth oil passage 14 (the SS/V OUT 24). Therefore, as illustrated in FIG. 2, the apparatus 1 can alleviate the changes (the change rates) of the pedal reaction force Fp and the like, thereby preventing or reducing the deterioration of the pedal feeling. In other words, the outflow amount Q2 via the SS/V OUT 24 at least immediately after time t1 is restricted to the predetermined amount by the orifice portion 24A. Therefore, P2 reduces at a lower speed, and the sudden reduction in P2 is eased (a damping effect). According thereto, the pressing force (the pedal reaction force) Fp reduces at a lower speed, so that the sudden reduction in Fp is alleviated. Further, the outflow amount Q2 is restricted, so that the pistons 220 and 52P are stroked at a lower speed, so that the sudden increase in the pedal stroke Sp is alleviated. According thereto, the large change in the pedal stroke speed ΔSp/Δt is alleviated. In this manner, the orifice portion 24A restricts the brake fluid flowing out of the backpressure chamber R2 into the intake oil passage 15 (the reservoir tank 4) via the fourth oil passage 14 to the predetermined flow amount when the assist pressure increase control is ended. By this restriction on the flow amount, the apparatus 1 can appropriately generate the pedal feeling when the brake pedal 2 is operated, even when switching the flow passage to the intake oil passage 15 (the reservoir tank 4). In this manner, the orifice portion 24A forms a pedal feeling generator. As viewed in another manner, the orifice portion 24A forms a characteristic adjustment unit that adjusts a flow characteristic (the outflow amount Q2) of the brake fluid flowing through the fourth oil passage 14. The orifice portion 24A adjusts the operation force (Fp) and the operation speed (ΔSp/Δt) by adjusting the above-described flow characteristic, when the brake pedal 2 is operated. By adjusting Fp or adjusting ΔSp/Δt, the apparatus 1 can easily adjust the pedal feeling, thereby acquiring an excellent pedal feeling.

In the present embodiment, the apparatus 1 is configured to achieve the functions of the above-described generation of the pedal feeling and adjustment of the flow characteristic by including the orifice portion 24A in the fourth oil passage 14, thereby succeeding in easily constructing the above-described pedal feeling generator and characteristic adjustment unit. Further, since being provided in the SS/V OUT 24, the orifice portion 24A can be realized only by adjusting how much to restrict the flow passage originally existing in the SS/V OUT 24 (how much to reduce the cross-sectional area of the flow passage). Therefore, the apparatus 1 can further easily construct the above-described pedal feeling generator and characteristic adjustment unit. The orifice portion 24A may be provided in the fourth oil passage 14 on the third oil passage 13 side with respect to the SS/V OUT 24.

The wheel cylinder hydraulic control unit 104 (the assist pressure increase control unit 105) activates the SS/V OUT 24 in the valve-opening direction when the assist pressure increase control is ended (i.e., when the wheel cylinder 8, the first oil passage 11, or the oil passage 13B is brought into the predetermined state). By this activation, the wheel cylinder hydraulic control unit 104 causes the brake fluid in the backpressure chamber R2 to be delivered into the intake oil passage 15 (the reservoir tank 4) via the fourth oil passage 14 while restricting this brake fluid to the predetermined flow amount. Therefore, the apparatus 1 can appropriately generate the pedal feeling when the brake pedal 2 is operated, even when switching the flow passage to the intake oil passage 15 (the reservoir tank 4). In this manner, the wheel cylinder hydraulic control unit 104 (the assist pressure increase control unit 105) forms a pedal feeling generation unit. In the present embodiment, the apparatus 1 mechanically realizes the above-described restriction on the flow amount by including the orifice portion 24A in the fourth oil passage 14, thereby succeeding in simplifying the control configuration of the above-described pedal feeling generation unit.

In the present embodiment, the SS/V IN 23 is configured as the proportional control valve. Therefore, the apparatus 1 can alleviate the sudden change in the flow amount of the brake fluid via the SS/V IN 23 by controlling the opening degree of the SS/V IN 23 when switching the control state of the SS/V IN 23 from the valve-opening direction to the valve-closing direction at the time of the end of the assist pressure increase control. Therefore, the apparatus 1 can further effectively alleviate the sudden change in the backpressure P2, thereby further reliably preventing or reducing the deterioration of the pedal feeling.

Second Embodiment

Figure 3:
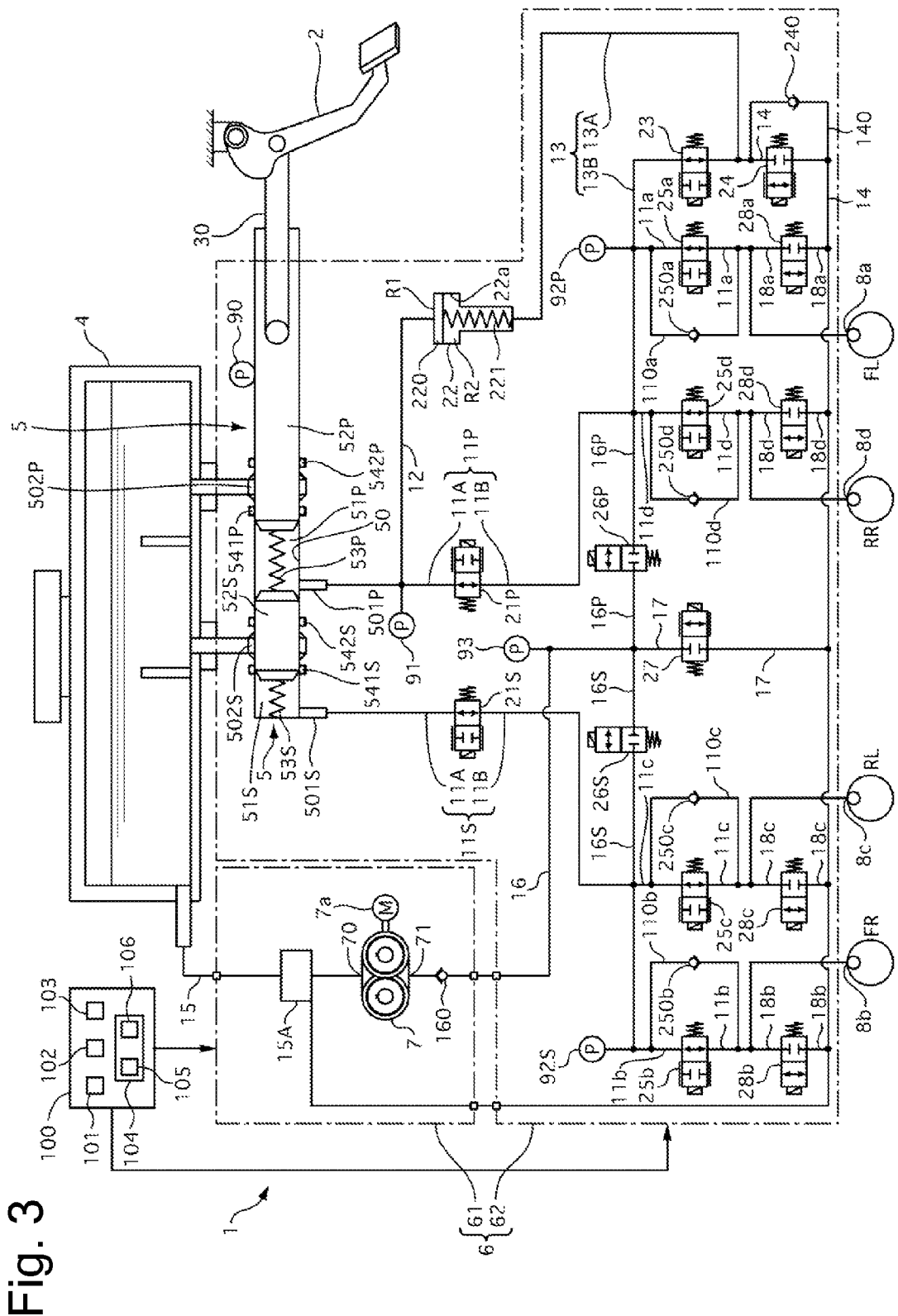
FIG. 3 schematically illustrates a configuration of a brake apparatus according to a second embodiment.

FIG. 3 is a similar diagram to FIG. 1 that schematically illustrates a configuration of the apparatus 1 according to a second embodiment. The apparatus 1 according to the present embodiment is different from the apparatus 1 according to the first embodiment in terms of alleviating the sudden change in the backpressure P2 by controlling an opening degree (a valve-opening amount) of the SS/V OUT 24. The bypass oil passage 130 and the check valve 230 like those in the first embodiment are not provided in the third oil passage 13. The orifice portion 24A like that in the first embodiment is not provided in the fourth oil passage 14 (the SS/V OUT 24). Further, the SS/V OUT 24 is the proportional control valve.

The wheel cylinder hydraulic control unit 104 (the assist pressure increase control unit 105) controls an opening degree Vo of the SS/V OUT 24 according to the magnitude of the backpressure P2 when controlling the SS/V OUT 24 in the valve-opening direction at the time of the end of the assist pressure increase control. More specifically, the wheel cylinder hydraulic control unit 104 (the assist pressure increase control unit 105) includes a map illustrated in FIG. 4. In this map, a relationship between P2 and Vo is preset. When P2 is a predetermined value P21 or lower, Vo is a maximum value Vomax. P21 is, for example, the atmospheric pressure. When P2 is equal to or higher than a predetermined value P22, which is higher than P21, Vo is a minimum value Vomin. When P2 falls within a range from P21 to P22, Vo reduces (in proportion to P2) as P2 increases. The wheel cylinder hydraulic control unit 104 (the assist pressure increase control unit 105) estimates the backpressure P2 from the pedal stroke Sp (the value detected by the stroke sensor 90) and the master cylinder hydraulic pressure Pm (the value detected by the hydraulic sensor 91). Then, the wheel cylinder hydraulic control unit 104 (the assist pressure increase control unit 105) refers to the above-described map, and sets Vo corresponding to estimated P2 as a target value of the control of the SS/V OUT 24. The other configuration is similar to the first embodiment, and therefore components corresponding to the first embodiment will be identified by the same reference numerals as the first embodiment and will not be redundantly described below.

Figure 4:
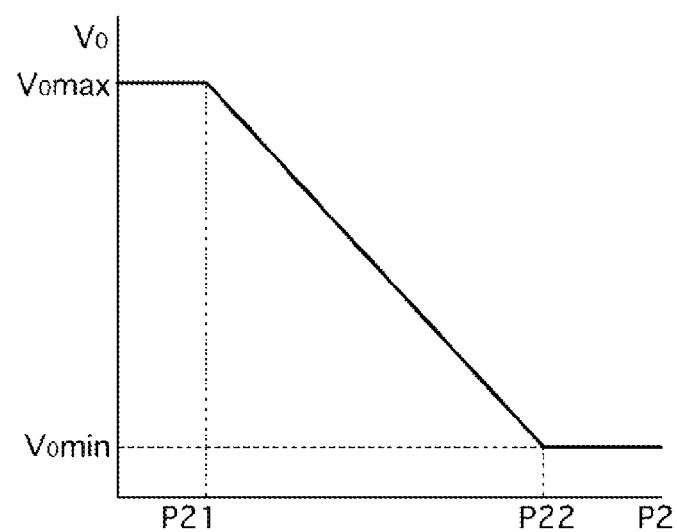
FIG. 4 is a map indicating a relationship between a backpressure of a stroke simulator and an opening degree of a stroke simulator OUT valve with respect to the brake apparatus according to the second embodiment.
Figure 5:
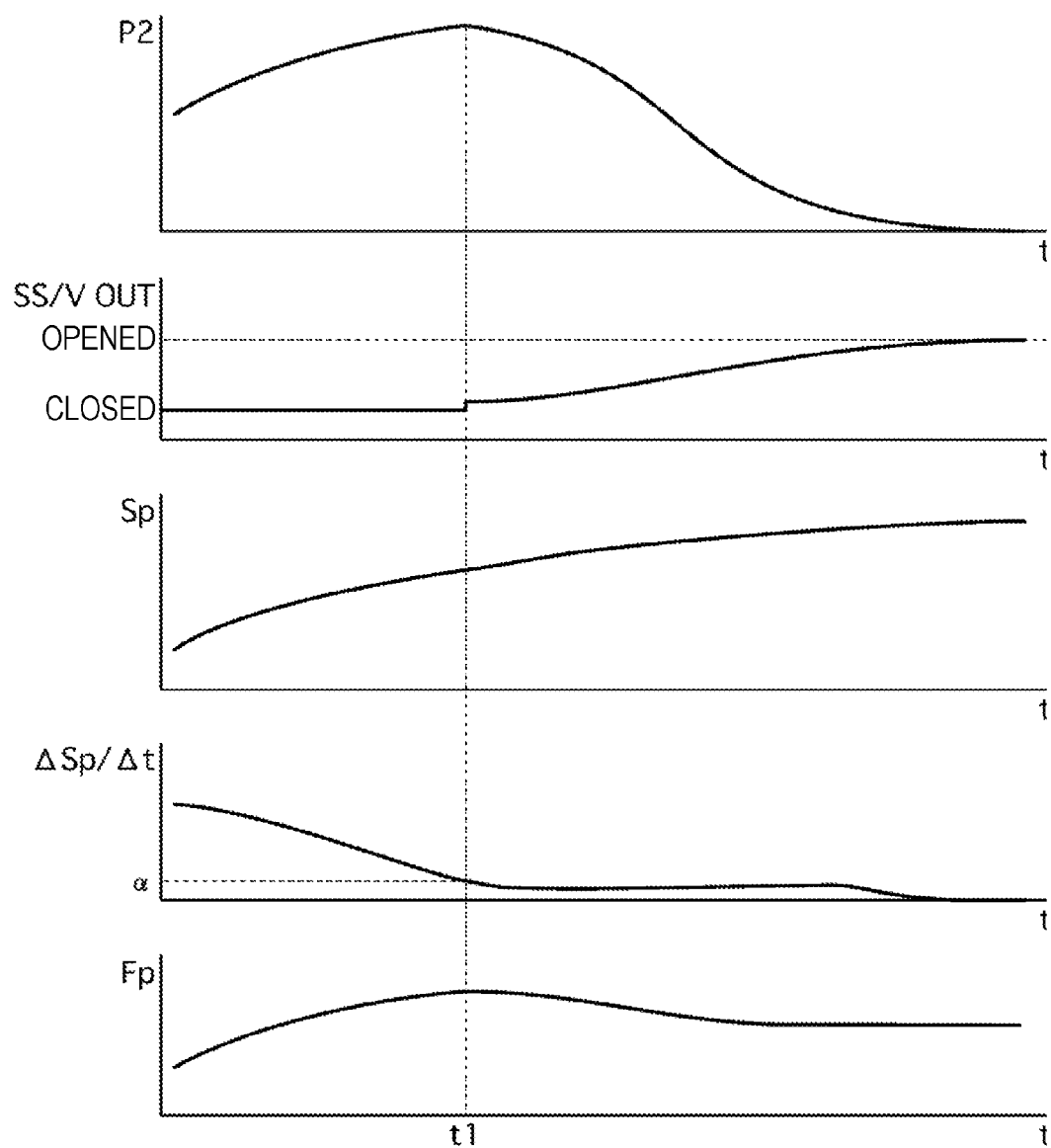
FIG. 5 is a timing chart when the brake apparatus according to the second embodiment ends the assist pressure increase control and shifts to the normal boosting control.

The above-described sudden change in the backpressure P2 according to switching the control state of the SS/V OUT 24 from the valve-closing direction to the valve-opening direction (refer to FIG. 8) is alleviated by proportionally controlling the opening degree Vo of the SS/V OUT 24. FIG. 5 is a similar timing chart to FIG. 2 with respect to the apparatus 1 according to the present embodiment. This timing chart is similar to FIG. 2 before time t1. At each point of time after time t1, the apparatus 1 controls the SS/V OUT 24 so as to achieve Vo corresponding to P2. P2 is high immediately after time t1, so that Vo is set to a small value. As Vo reduces, the outflow amount Q2 via the SS/V OUT 24 reduces. Therefore, immediately after time t1, Q2 is restricted to a large degree. After time t1, Vo is set to a large value according to the reduction in P2. As Vo increases, the outflow amount Q2 via the SS/V OUT 24 increases. As a result, Q2 is restricted to a smaller degree. Therefore, this results in a further gentle reduction in P2 than the first embodiment (refer to FIG. 2) and thus further ease of the sudden reduction in P2 at least immediately after time t1. Therefore, the sudden changes (the change rates) in the pedal reaction force Fp and the like can be further alleviated. Throughout before and after time t1, Fp and Sp change continuously (smoothly not in a stepwise manner). ΔSp/Δt continuously reduces throughout before and after time t1, and then converges to a predetermined value. In this manner, the apparatus 1 proportionally controls Vo according to the magnitude of P2, thereby allowing the SS/V OUT 24 to function as a so-called variable orifice (a similar orifice to the orifice portion 24A in the first embodiment that is configured to be able to restrict the flow by a variable amount), thus succeeding in further appropriately controlling Q2. Therefore, the apparatus 1 can further ease the change in P2, and thus further effectively prevent or reduce the deterioration of the pedal feeling. The relational characteristic indicated in the map illustrated in FIG. 4 is merely one example, and the relationship between P2 and Vo may be set to another characteristic than that. Further, the apparatus 1 may be configured to control the valve-opening amount of the SS/V OUT 24 with use of not only the map but also another means or method. Further, the apparatus 1 may be configured to adjust a valve-opening time period along with Vo as the valve-opening amount.

In this manner, the SS/V OUT 24 restricts the brake fluid flowing out of the backpressure chamber R2 to the intake oil passage 15 (the reservoir tank 4) via the fourth oil passage 14 to the predetermined flow amount by being controlled to be opened by the predetermined valve-opening amount when the assist pressure increase control is ended. By this restriction on the flow amount, the apparatus 1 can appropriately generate the pedal feeling when the brake pedal 2 is operated, even when switching the flow passage to the intake oil passage 15 (the reservoir tank 4). In this manner, the SS/V OUT 24 forms the pedal feeling generator. As viewed in another manner, the SS/V OUT 24 forms the characteristic adjustment unit that adjusts the flow characteristic (the outflow amount Q2) of the brake fluid flowing through the fourth oil passage 14. By adjusting the above-described flow characteristic, the SS/V OUT 24 adjusts the operation force (Fp) and the operation speed (ΔSp/Δt) when the brake pedal 2 is operated, thereby allowing the apparatus 1 to easily adjust the pedal feeling.

The wheel cylinder hydraulic control unit 104 (the assist pressure increase control unit 105) controls the valve-opening state of the SS/V OUT 24 when ending the assist pressure increase control (i.e., when the wheel cylinder 8, the first oil passage 11, or the third oil passage 13 is brought into the predetermined state). By this control, the wheel cylinder hydraulic control unit 104 (the assist pressure increase control unit 105) causes the brake fluid in the backpressure chamber R2 to flow into the intake oil passage 15 (the reservoir tank 4) via the fourth oil passage 14 while restricting the brake fluid in the backpressure chamber R2 to the predetermined flow amount. Therefore, the apparatus 1 can generate the pedal feeling when the brake pedal 2 is operated, even when switching the flow passage to the intake oil passage 15 (the reservoir tank 4). In this manner, the wheel cylinder hydraulic control unit 104 (the assist pressure increase control unit 105) forms the pedal feeling generation unit. In the present embodiment, the apparatus 1 is configured to achieve the functions of the above-described generation of the pedal feeling and adjustment of the flow characteristic with use of the SS/V OUT 24 provided in the fourth oil passage 14, thereby succeeding in easily constructing the above-described pedal feeling generator and characteristic adjustment unit. Further, the apparatus 1 realizes the above-described restriction on the flow amount based on the control by controlling the valve-opening state of the SS/V OUT 24 provided in the fourth oil passage 14, thereby eliminating the necessity of the provision of the orifice portion 24A in the fourth oil passage 14 (the SS/V OUT 24), succeeding in simplifying the configuration thereof. Further, the apparatus 1 can further easily acquire a smooth pedal feeling by including the SS/V OUT 24 configured as the proportional control valve and controlling this SS/V OUT 24 to the predetermined valve-opening amount. Other than that, the second embodiment can acquire similar advantageous effects to the first embodiment by a similar configuration to the first embodiment.

Third Embodiment

Figure 6:
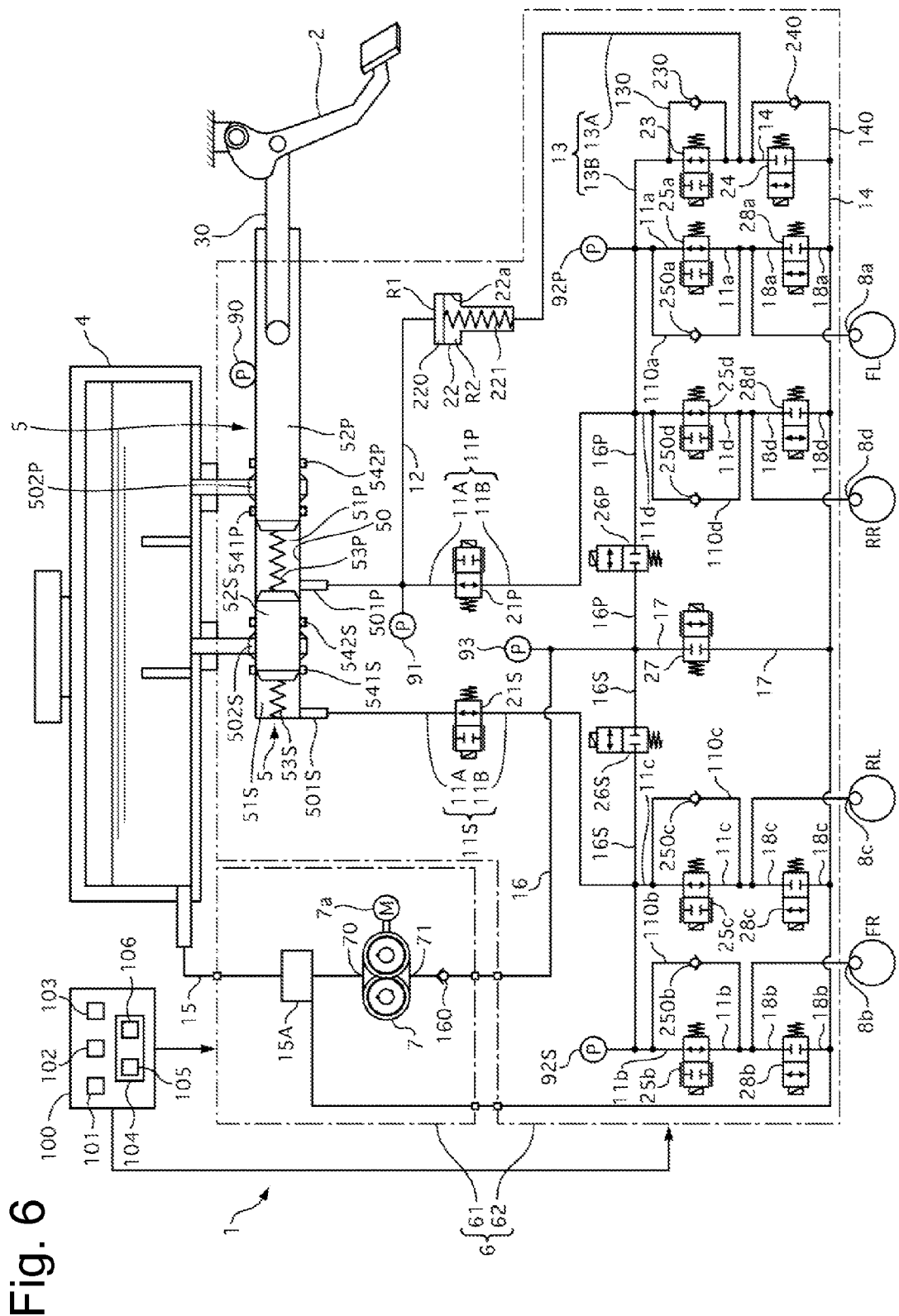
FIG. 6 schematically illustrates a configuration of a brake apparatus according to a third embodiment.

FIG. 6 is a similar diagram to FIG. 1 that schematically illustrates a configuration of the apparatus 1 according to a third embodiment. The apparatus 1 according to the present embodiment is different from the apparatus 1 according to the first embodiment in terms of alleviating the sudden change in the backpressure P2 by repeatedly controlling the opening/closing of the SS/V OUT 24. The orifice portion 24A like that in the first embodiment is not provided in the fourth oil passage 14 (the SS/V OUT 24).

The wheel cylinder hydraulic control unit 104 (the assist pressure increase control unit 105) repeatedly controls the opening/closing of the SS/V OUT 24 when controlling the SS/V OUT 24 in the valve-opening direction at the time of the end of the assist pressure increase control. More specifically, the wheel cylinder hydraulic control unit 104 (the assist pressure increase control unit 105) first controls the SS/V OUT 24 in the valve-opening direction only for a predetermined first valve-opening time period upon determining to end the assist pressure increase control. Next, the wheel cylinder hydraulic control unit 104 (the assist pressure increase control unit 105) controls the SS/V OUT 24 in the valve-closing direction only for a predetermined valve-closing time period. After that, the wheel cylinder hydraulic control unit 104 (the assist pressure increase control unit 105) controls the SS/V OUT 24 in the valve-opening direction again only for a predetermined second valve-opening direction. Next, the wheel cylinder hydraulic control unit 104 (the assist pressure increase control unit 105) controls the SS/V OUT 24 in the valve-closing direction only for the above-described valve-closing time period. After that, the wheel cylinder hydraulic control unit 104 (the assist pressure increase control unit 105) continues controlling the SS/V OUT 24 in the valve-opening direction. The second valve-opening time period is set to a longer time period than the first valve-opening time period. The other configuration is similar to the first embodiment, and therefore components corresponding to the first embodiment will be identified by the same reference numerals as the first embodiment and will not be redundantly described below.

Figure 7:
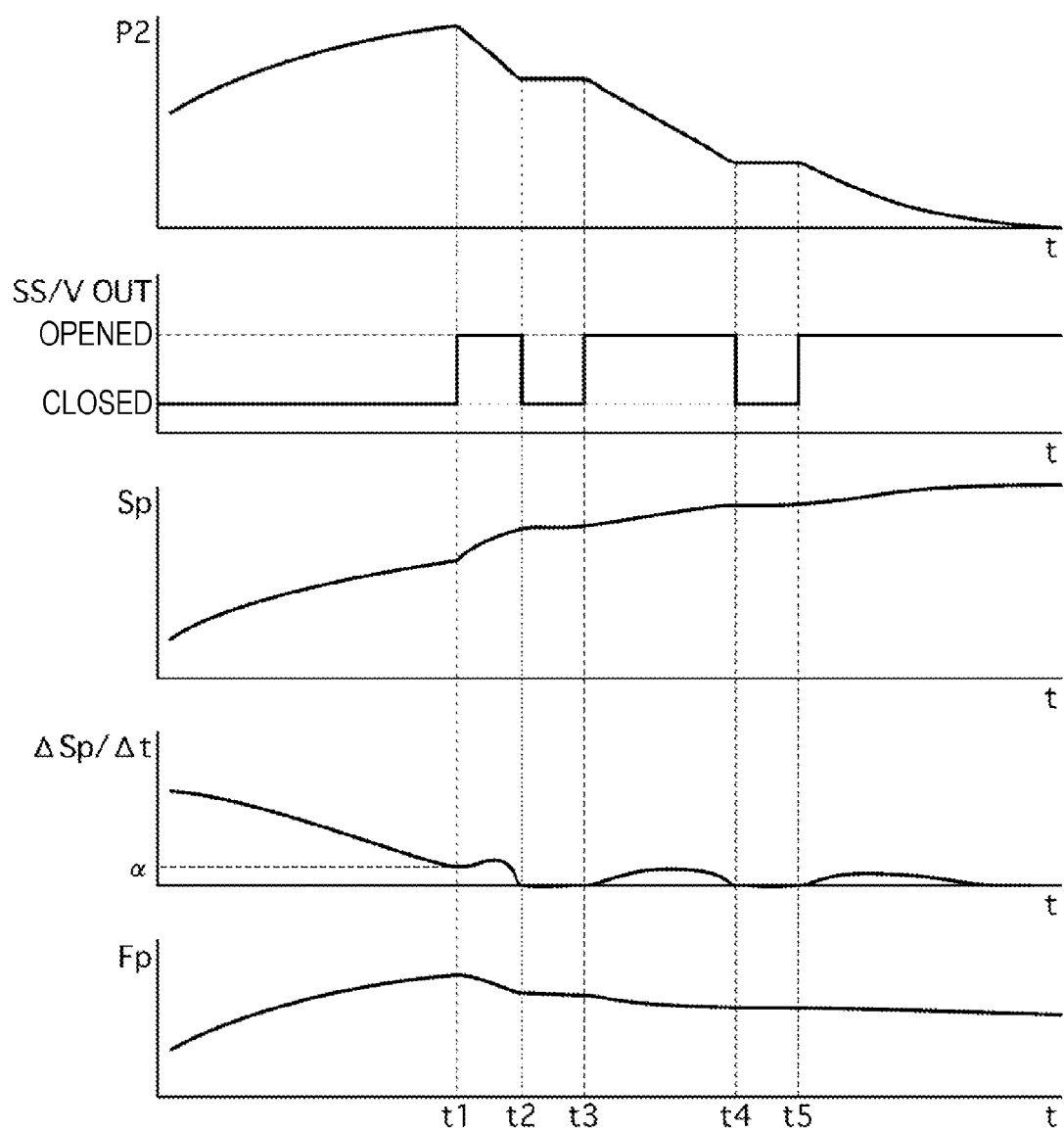
FIG. 7 is a timing chart when the brake apparatus according to the third embodiment ends the assist pressure increase control and shifts to the normal boosting control.

The above-described sudden change in the backpressure P2 according to switching the control state of the SS/V OUT 24 from the valve-closing direction to the valve-opening direction (refer to FIG. 8) is alleviated by repeatedly opening and closing the SS/V OUT 24. FIG. 7 is a similar timing chart to FIG. 2 with respect to the apparatus 1 according to the present embodiment. This timing chart is similar to FIG. 2 before time t1. During the first valve-opening time period from time t1 to t2, the apparatus 1 controls the SS/V OUT 24 in the valve-opening direction. During the valve-closing time period from time t2 to t3, the apparatus 1 controls the SS/V OUT 24 in the valve-closing direction. During the second valve-opening time period from time t3 to t4, the apparatus 1 controls the SS/V OUT 24 in the valve-opening direction. During the valve-closing time period from time t4 to t5, the apparatus 1 controls the SS/V OUT 24 in the valve-closing direction. After time t5, the apparatus 1 controls the SS/V OUT 24 in the valve-opening direction.

The insertion of the valve-closing time period between the valve-opening time periods in this manner leads to alleviation of the sudden change in the backpressure P2 in a short time, thereby making the change in P2 gentle as a whole. For example, due to the insertion of the valve-closing time period between the first valve-opening time period and the second valve-opening time period, a total of the outflow amount Q2 via the SS/V OUT 24, i.e., the amount of the reduction in P2 from time t1 to t2 becomes just equal to a total of the above-described flow amount Q2, i.e., the amount of the reduction in P2 from time t1 to t3. Therefore, the amount of the reduction in P2 from time t1 to t3 is smaller compared to when the valve-closing time period is not inserted. In other words, an average speed of the reduction in P2 from time t1 to t3 reduces, so that the sudden change thereof is alleviated. Similarly, an average speed of the reduction in Fp reduces, so that the sudden reduction in Fp is alleviated. An average speed of the increase in Sp reduces, so that the sudden increase in Sp is alleviated. According thereto, the large change in ΔSp/Δt is also alleviated. The apparatus 1 can make the changes (the change rates) in Fp and the like further gentle as a whole, thereby further effectively preventing or reducing the deterioration of the pedal feeling, by repeating the insertion of the valve-closing time period between the valve-opening time periods a plurality times as described above. As time t1 is approaching, the magnitude of Q2, i.e., the changes (the change rates) in P2, Fp, and the like further increase. In the present embodiment, the apparatus 1 can further effectively alleviate the changes in Fp and the like by setting the valve-opening time so as to reduce it as time t1 is approaching.

How many times the insertion is repeated as described above may be arbitrarily set. More specifically, the operation of opening the SS/V OUT 24 when the assist pressure increase control is ended may be performed not only three times but also twice or four or more times. In other words, the operation of closing the SS/V OUT 24 may be performed not only twice but also once or three or more times. As illustrated in FIG. 7, Fp and Sp change discontinuously (in a stepwise manner). However, it is highly likely that the anti-lock control intervenes at the time of the sudden brake operation in which the assist pressure increase control is performed. Therefore, even when Fp and Sp change in the stepwise manner like the present embodiment at the time of (immediately after) the sudden brake operation, the driver can understand that this stepwise change is caused due to the transmission of the change in the hydraulic pressure in the wheel cylinder 8 to the brake pedal 2 according to the activation of the anti-lock control. Therefore, it is less likely that the pedal feeling is deteriorated.

In this manner, the SS/V OUT 24 restricts the brake fluid flowing out of the backpressure chamber R2 to the intake oil passage 15 (the reservoir tank 4) via the fourth oil passage 14 to the predetermined flow amount by being controlled so as to be repeatedly opened and closed when the assist pressure increase control is ended. By this restriction on the flow amount, the apparatus 1 can appropriately generate the pedal feeling when the brake pedal 2 is operated, even when switching the flow passage to the intake oil passage 15 (the reservoir tank 4). In this manner, the SS/V OUT 24 forms the pedal feeling generator. As viewed in another manner, the SS/V OUT 24 forms the characteristic adjustment unit that adjusts the flow characteristic (a time period during which the flow continues) of the brake fluid flowing through the fourth oil passage 14. By adjusting the above-described flow characteristic, the SS/V OUT 24 adjusts the operation force (Fp) and the operation speed (ΔSp/Δt) when the brake pedal 2 is operated, thereby allowing the apparatus 1 to easily adjust the pedal feeling. In the present embodiment, the apparatus 1 can achieve the functions of the above-described generation of the pedal feeling and adjustment of the flow characteristic while reducing the cost required for the SS/V OUT 24, by including the SS/V OUT 24 configured as the two-position valve and controlling this SS/V OUT 24 so as to repeatedly open and close it. The wheel cylinder hydraulic control unit 104 (the assist pressure increase control unit 105) forms the pedal feeling generation unit similar to the second embodiment. Other than that, the third embodiment can acquire similar advantageous effects to the first and second embodiments by a similar configuration to the first and second embodiments.

Fourth Embodiment

The apparatus 1 according to the present embodiment is different from the apparatus 1 according to the first embodiment in terms of controlling the SS/V IN 23 in the valve-closing direction even while performing the assist pressure increase control. The wheel cylinder hydraulic control unit 104 controls the SS/V IN 23 in the valve-closing direction during the boosting control including the assist pressure increase control (when the brake operation is performed regardless of whether this brake operation is the sudden brake operation). The assist pressure increase control unit 105 starts and performs the assist pressure increase control by controlling the SS/V OUT 24 in the valve-closing direction, and ends the assist pressure increase control by controlling the SS/V OUT 24 in the valve-opening direction. Conditions for determining whether to start and end the assist pressure increase control are similar to the first embodiment. The third oil passage 13 (passing through the bypass oil passage 130) is divided into the oil passage 13A on the backpressure chamber R2 side and the oil passage 13B on the first oil passage 11 side by the check valve 230 with the SS/V IN 23 in the valve-closed state. A restriction amount of the check valve 230 in the opened state is set to smaller than the restriction amount of the orifice portion 24A. In other words, the flow passage resistance of the orifice portion 24A is set to higher than a flow passage resistance of the check valve 230 in the opened state. The other configuration is similar to the first embodiment.

When the sudden brake operation is performed, the responsiveness of the increase in the pressure using the pump 7 becomes insufficnet, so that the hydraulic pressure P2 on the backpressure chamber R2 side (the oil passage 13A) with respect to the check valve 230 exceeds the hydraulic pressure Pw on the first oil passage 11 (11B) side (the oil passage 13B). At this time, the check valve 230 is opened, so that the brake fluid flowing out of the backpressure chamber R2 is transmitted to the first oil passage 11 (11B) via the third oil passage 13. In this manner, the pressure in the wheel cylinder 8 is increased with use of the operation of pressing the brake pedal 2 (the activation of the stroke simulator 22). Controlling the SS/V OUT 24 in the valve-closing direction blocks the communication between the backpressure chamber R2 and the intake oil passage 15 (the reservoir tank 4). Therefore, the transmission of the brake fluid flowing out of the backpressure chamber R2 to the intake oil passage 15 (the reservoir tank 4) via the fourth oil passage 14 is prohibited or reduced.

When the responsiveness of the increase in the pressure using the pump 7 becomes sufficient, and the hydraulic pressure Pw on the first oil passage 11 side (the wheel cylinder 8, or the first oil passage 11 or the oil passage 13B in communication therewith) with respect to the check valve 230 reaches or exceeds the hydraulic pressure P2 on the backpressure chamber R2 side (the oil passage 13A), the brake fluid flowing out of the backpressure chamber R2 stops heading toward the first oil passage 11 (11B) via the third oil passage 13. In this manner, the increase of the pressure in the wheel cylinder 8 with use of the operation of pressing the brake pedal 2 is ended. Further, when the wheel cylinder 8, or the first oil passage 11 or the oil passage 13B in communication therewith is brought into the predetermined state, in particular, the above-described hydraulic pressure Pw reaches or exceeds P2, the check valve 230 is closed. As a result, a reverse flow of the brake fluid from the wheel cylinder 8 side to the backpressure chamber R2 via the third oil passage 13 is prohibited or reduced. Controlling the SS/V OUT 24 in the valve-opening direction establishes the communication between the backpressure chamber R2 and the intake oil passage 15 (the reservoir tank 4). Therefore, the brake fluid flowing out of the backpressure chamber R2 heads toward the intake oil passage 15 (the reservoir tank 4) via the fourth oil passage 14. In other words, instead of the SS/V IN 23 like the first embodiment, the check valve 230 forms the above-described flow passage switching unit (a part thereof). The check valve 230 is automatically activated to be opened or closed according to the difference ΔPin between the hydraulic pressures P2 and Pw, by which the apparatus 1 switches the communication state of the third oil passage 13, thereby switching whether to supply the brake fluid from the backpressure chamber R2 to the wheel cylinder 8.

Similarly to the first embodiment, the orifice portion 24A restricts the brake fluid flowing out of the backpressure chamber R2 into the intake oil passage 15 (the reservoir tank 4) via the fourth oil passage 14 to the predetermined flow amount when ending the assist pressure increase control by controlling the SS/V OUT 24 in the valve-opening direction. Similarly to the first embodiment, the orifice portion 24A forms the pedal feeling generator and the characteristic adjustment unit, and the wheel cylinder hydraulic control unit 104 (the assist pressure increase control unit 105) forms the pedal feeling generation unit. The apparatus 1 can further easily form the above-described pedal feeling generation unit by using the check valve 230 instead of the SS/V IN 23 as the above-described flow passage switching unit. Further, this configuration eliminates the necessity of the operation of opening and closing the SS/V IN 23 when starting and ending the assist pressure increase control, thereby contributing to improving a noise and vibration performance of the apparatus 1. Other than that, the fourth embodiment can acquire similar advantageous effects to the first embodiment by a similar configuration to the first embodiment.

The SS/V IN 23 may be omitted in the third oil passage 13, and only the check valve 23 may be provided. Even in this case, the above-described flow passage switching unit (a part thereof) can be formed by the check valve 230, and the SS/V IN 23 as the electromagnetic valve can be omitted, whereby the apparatus 1 can be simplified. Further, instead of including the orifice portion 24A, the apparatus 1 may include the SS/V OUT 24 configured as the proportional control valve and control the opening degree thereof when ending the assist pressure increase control similarly to the second embodiment. Further, the apparatus 1 may control the SS/V OUT 24 so as to repeatedly open and close the SS/V OUT 24 when ending the assist pressure increase control similarly to the third embodiment. Further, the apparatus 1 may be configured to control the SS/V OUT 24 in the valve-opening direction even during the assist pressure increase control. In this case, a part of the brake fluid flowing out of the backpressure chamber R2 heads toward the intake oil passage 15 (the reservoir tank 4) via the SS/V OUT 24 (the fourth oil passage 14). However, the restriction amount of the check valve 230 in the opened state is set to smaller than the restriction amount of the orifice portion 24A, whereby most of the brake fluid flowing out of the backpressure chamber R2 is transmitted to the first oil passage 11 (11B) via the check vale 230 (the third oil passage 13). As a result, the apparatus 1 can effectively increase the pressure in the wheel cylinder 8 with use of the operation of pressing the brake pedal 2. Configuring the apparatus 1 so as to continue controlling the SS/V OUT 24 in the valve-opening direction in this manner allows the backpressure P2 to change further gently throughout before and after the check valve 230 is switched from the valve-opened state to the valve-closed state (before and after the end of increasing the pressure in the wheel cylinder 8 with use of the operation of pressing the brake pedal 2). Therefore, the apparatus 1 can acquire a further excellent pedal feeling. The apparatus 1 may be configured to omit the SS/V OUT 24 therefrom. In this case, the above-described flow passage switching unit (a part thereof) is formed by the orifice portion 24A, and the check valve 230 and the orifice portion 24A realize the content of the control (the start, the execution, and the end of the assist pressure increase control) according to the first embodiment automatically (without relying on the direct control).

Other Embodiments

Having described embodiments for implementing the present invention based on the examples thereof, the specific configuration of the present invention is not limited to the exemplary embodiments, and the present invention also includes a design modification and the like thereof made within a scope that does not depart from the spirit of the present invention. For example, the brake apparatus (the brake system) to which the present invention is applied may be any brake apparatus including a mechanism for simulating the operation reaction force (the stroke simulator), and capable of increasing the pressure in the wheel cylinder with use of a hydraulic source other than the master cylinder, and is not limited to the brake apparatus in the exemplary embodiments. In the exemplary embodiments, the hydraulic wheel cylinder is provided at each of the wheels, but the configuration of the brake apparatus is not limited thereto and the brake apparatus may be configured in such a manner that, for example, the hydraulic wheel cylinder is provided at the front wheel side and a caliper capable of generating the braking force with use of an electric motor is mounted on the rear wheel side. Further, the method for activating each of the actuators for controlling the wheel cylinder hydraulic pressure, such as the method for setting the number of rotations of the motor (the instruction value), is not limited to the method in the exemplary embodiments, and can be arbitrarily changed. A booster that amplifies the pressing force to transmit the amplified pressing force to the master cylinder may be provided between the brake pedal and the master cylinder. For example, the brake apparatus may include a link-type variable booster capable of mechanically transmitting motive power between the brake pedal and the master cylinder and capable of providing a variable boosting rate. The fluid pool 15A is provided in the exemplary embodiments, but may be omitted. With the provision of the fluid pool 15A, the fluid pool 15A can be used as a supply source and a discharge destination (a reservoir) of the brake fluid, even at the time of such a failure that the brake fluid leaks out of the intake oil passage 15 at a portion of the brake pipe connecting the reservoir tank 4 and the first unit 61 (for example, a portion of this brake pile that is connected to the first unit 61). Therefore, the boosting control (the increase and the reduction in the wheel cylinder hydraulic pressure) using the pump 7 and the assist pressure increase control can continue, whereby a stable brake performance can be acquired and a fail-safe performance can be improved.

In the following description, one example of technical ideas recognizable from the exemplary embodiments will be described.

(a1) A brake apparatus includes a hydraulic source configured to generate a hydraulic pressure in a first oil passage with use of brake fluid supplied from a reservoir to generate a hydraulic pressure in a wheel cylinder, a stroke simulator configured to be axially activated in a cylinder by the brake fluid supplied from a master cylinder and configured to generate an operation reaction force accompanying a brake operation performed by a driver by activation of a piston dividing at least an inside of the cylinder into two chambers, a second oil passage provided between one of the two chambers of the stroke simulator and the master cylinder, a third oil passage provided between the other chamber of the stroke simulator and the first oil passage and configured to transmit the brake fluid flowing out of the other chamber to the first oil passage, a stroke simulator IN valve provided in the third oil passage, a fourth oil passage connecting a portion in the third oil passage between the other chamber and the stroke simulator IN valve and a low-pressure portion, a stroke simulator OUT valve provided in the fourth oil passage, and a pedal feeling generator. The pedal feeling generator is configured to activate the stroke simulator OUT valve in a valve-closing direction to increase the pressure in the wheel cylinder with use of the brake fluid flowing out of the other chamber into the third oil passage via the stroke simulator IN valve according to a state of an operation performed by the driver on a brake pedal. The pedal feeling generator is further configured to, when the hydraulic pressure in the wheel cylinder or the first oil passage is brought into a predetermined state, activate the stroke simulator IN valve in the valve-closing direction to cause the brake fluid in the other chamber to flow out to the low-pressure portion via the stroke simulator OUT valve while restricting the brake fluid in the other chamber to a predetermined flow amount, thereby generating a pedal feeling of the brake pedal.

(a2) In the brake apparatus described in (a1), the pedal feeling generator includes the stroke simulator OUT valve.

(a3) In the brake apparatus described in (a1) or (a2), the stroke simulator OUT valve includes an orifice portion.

(a4) In the brake apparatus described in (a2), the orifice portion is provided on the low-pressure portion side of the stroke simulator OUT vale.

(a5) In the brake apparatus described in (a1) or (a2), the stroke simulator OUT valve is a proportional control valve, and the pedal feeling generator is formed by controlling the proportional control valve to a predetermined valve-opening amount.

(a6) In the brake apparatus described in (a1) or (a2), the stroke simulator OUT valve is a two-position valve, and the pedal feeling generator is formed by repeatedly opening and closing the two-position valve.

(a7) In the brake apparatus described in any of (a1) to (a6), the pedal feeling generator adjusts an operation speed when the brake pedal is operated.

(a8) In the brake apparatus described in any of (a1) to (a7), the pedal feeling generator adjusts an operation pressing force when the brake pedal is operated.

(a9) In the brake apparatus described in any of (a1) to (a8), the pedal feeling generator includes the stroke simulator IN valve, and the stroke simulator IN valve is a one-way valve that permits only a flow of the brake fluid from the other chamber to the first oil passage.

(a10) A brake apparatus includes a first oil passage connecting a master cylinder configured to be activated according to a brake operation performed by a driver to generate a hydraulic pressure and a wheel cylinder provided at a wheel, a pump configured to generate the hydraulic pressure in the first oil passage with use of brake fluid supplied from a reservoir, a cut valve provided in the first oil passage between the pump and the master cylinder, and a stroke simulator including a piston configured to be axially activated in a cylinder by the brake fluid and dividing at least an inside of the cylinder into two chambers. The stroke simulator is configured to generate an operation reaction force accompanying the brake operation performed by the driver by the activation of the piston. The brake apparatus further includes a second oil passage connecting one of the two chambers of the stroke simulator and a portion in the first oil passage between the cut valve and the master cylinder, a third oil passage connecting the other chamber of the stroke simulator and a portion in the first oil passage between the cut valve and the wheel cylinder, a fourth oil passage connecting the third oil passage and a low-pressure portion, a stroke simulator OUT valve provided in the fourth oil passage, and a control unit configured to control the pump, the cut valve, and the stroke simulator OUT valve. The control unit includes a wheel cylinder pressure increase control unit configured to, according to a state of the brake operation performed by the driver, drive the pump and activate the cut valve and the stroke simulator OUT valve in a valve-closing direction, cause the brake fluid to flow from the master cylinder into the one chamber by an amount according to an amount of the brake operation to activate the piston, and increase a pressure in the wheel cylinder by the brake fluid as much as the amount according to the amount of the brake operation that flows out from the other chamber via the third oil passage due to an increase in a volume of the one chamber, thereby assisting the generation of the hydraulic pressure in the wheel cylinder using the pump. The control unit further includes a pedal feeling generation unit configured to, when a state of the wheel cylinder, the first oil passage, or the third oil passage shifts to a predetermined state, activate the stroke simulator OUT valve in a valve-opening direction to cause the brake fluid in the other chamber to flow out to the low-pressure portion via the fourth oil passage while restricting the brake fluid in the other chamber to a predetermined flow amount.

(a11) In the brake apparatus described in (a10), the pedal feeling generation unit controls a valve-opening state of the stroke simulator OUT valve.

(a12) The brake apparatus described in any of (a10) and (a11) further includes an orifice portion in the fourth oil passage.

(a13) In the brake apparatus described in (a12), the orifice portion is provided on the low-pressure portion side with respect to the stroke simulator OUT valve.

(a14) In the brake apparatus described in any of (a10) and (a11), the stroke simulator OUT valve is a proportional control valve, and the pedal feeling generation unit is formed by controlling the proportional control valve to a predetermined valve-opening amount.

(a15) In the brake apparatus described in any of (a10) and (a11), the stroke simulator OUT valve is a two-position valve, and the pedal feeling generation unit is formed by repeatedly opening and closing the two-position valve.

(a16) A brake apparatus includes a pump configured to generate a hydraulic pressure in a first oil passage with use of brake fluid supplied from a reservoir to generate a hydraulic pressure in a wheel cylinder and including a first one-way valve that permits a flow of the brake fluid to the first oil passage, and a stroke simulator including a piston configured to be axially activated in a cylinder by the brake fluid supplied from a master cylinder and dividing at least an inside of the cylinder into two chambers. The stroke simulator is configured to generate an operation reaction force accompanying a brake operation performed by a driver by the activation of the piston. The brake apparatus further includes a second oil passage provided between one of the two chambers of the stroke simulator and the master cylinder, a third oil passage provided between the other chamber of the stroke simulator and the first oil passage, serving as an oil passage for transmitting the brake fluid flowing out of the other chamber to the first oil passage, and including a second one-way valve that permits a flow of the brake fluid to the first oil passage, a fourth oil passage branching from a portion in the third oil passage between the second one-way valve and the other chamber, provided between the other chamber and the reservoir, and configured to permit both a flow of the brake fluid from the other chamber and a flow of the brake fluid from the reservoir, and a characteristic adjustment unit provided in the fourth oil passage and configured to adjust a flow characteristic of the brake fluid flowing through the fourth oil passage.

(a17) In the brake apparatus described in (a16), an operation speed when the driver performs the brake operation is adjusted by the characteristic adjustment unit.

(a18) In the brake apparatus described in (a16) or (a17), an operation force when the driver performs the brake operation is adjusted by the characteristic adjustment unit.

(a19) In the brake apparatus described in any of (a16) to (a18), the fourth oil passage includes a stroke simulator OUT valve, and the characteristic adjustment unit includes the stroke simulator OUT valve.

(a20) In the brake apparatus described in (a19), the stroke simulator OUT valve includes an orifice portion.

According to the above-described embodiments, it is possible to improve the responsiveness of the increase in the pressure in the wheel cylinder while preventing or cutting down, for example, the increase in the size of the actuator.

Having described merely several embodiments of the present invention, it is apparent to those skilled in the art that the embodiments described as the examples can be modified or improved in various manners without substantially departing from the novel teachings and advantages of the present invention. Therefore, such modified or improved embodiments are intended to be also contained in the technical scope of the present invention.

Having described the embodiments of the present invention based on the several examples, the above-described embodiments of the present invention are intended to only facilitate the understanding of the present invention, and are not intended to limit the present invention thereto. Needless to say, the present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority to Japanese Patent Application No. 2014-178635 filed on Sep. 3, 2014. The entire disclosure of Japanese Patent Application No. 2014-178635 filed on Sep. 3, 2014 including the specification, the claims, the drawings, and the abstract is incorporated herein by reference in its entirety.

The entire disclosure of Japanese Patent Application Public Disclosure No. 2010-83411 (PTL 1) including the specification, the claims, the drawings, and the abstract is incorporated herein by reference in its entirety.

REFERENCE SIGNS LIST 1 brake apparatus
2 brake pedal
4 reservoir tank (reservoir, low-pressure portion)
5 master cylinder
7 pump (hydraulic source)
8 wheel cylinder
11 first oil passage
12 second oil passage
13 third oil passage
14 fourth oil passage
21 cut valve
22 stroke simulator
220 piston
23 stroke simulator IN valve
230 check valve (second one-way valve)
24 stroke simulator OUT valve (pedal feeling generator, characteristic adjustment unit)
24A orifice portion (pedal feeling generator, characteristic adjustment unit)
100 ECU (control unit)
104 wheel cylinder hydraulic control unit (pedal feeling generation unit)
105 assist pressure increase control unit (wheel cylinder pressure increase control unit, pedal feeling generation unit) FL to RR wheel
R1 positive pressure chamber
R2 backpressure chamber

The invention claimed is:

1. A brake apparatus comprising:
a hydraulic source configured to generate a hydraulic pressure in a first oil passage with use of brake fluid supplied from a reservoir to generate a hydraulic pressure in a wheel cylinder;
a stroke simulator configured to be axially activated in a cylinder by the brake fluid supplied from a master cylinder, the stroke simulator being configured to generate an operation reaction force accompanying a brake operation performed by a driver by activation of a piston dividing at least an inside of the cylinder into two chambers;
a second oil passage provided between one of the two chambers of the stroke simulator and the master cylinder;
a third oil passage provided between the other chamber of the stroke simulator and the first oil passage, the third oil passage being configured to transmit the brake fluid flowing out of the other chamber to the first oil passage;
a stroke simulator IN valve provided in the third oil passage;
a fourth oil passage connecting a portion in the third oil passage between the other chamber and the stroke simulator IN valve, and a low-pressure portion;
a stroke simulator OUT valve provided in the fourth oil passage; and
a pedal feeling generator configured to activate the stroke simulator OUT valve in a valve-closing direction to increase the pressure in the wheel cylinder with use of the brake fluid flowing out of the other chamber into the third oil passage via the stroke simulator IN valve according to a state of an operation performed by the driver on a brake pedal, the pedal feeling generator being further configured to, when the hydraulic pressure in the wheel cylinder or the first oil passage is brought into a predetermined state, activate the stroke simulator IN valve in the valve-closing direction to cause the brake fluid in the other chamber to flow out to the low-pressure portion via the stroke simulator OUT valve while restricting the brake fluid in the other chamber to a predetermined flow amount, thereby generating a pedal feeling of the brake pedal.

2. The brake apparatus according to claim 1, wherein the pedal feeling generator includes the stroke simulator OUT valve.

3. The brake apparatus according to claim 2, wherein the stroke simulator OUT valve includes an orifice portion.

4. The brake apparatus according to claim 3, wherein the orifice portion is provided on one side of the stroke simulator OUT vale that is located closer to the low-pressure portion.

5. The brake apparatus according to claim 2, wherein the stroke simulator OUT valve is a proportional control valve, and the pedal feeling generator is formed by controlling the proportional control valve to a predetermined valve-opening amount.

6. The brake apparatus according to claim 2, wherein the stroke simulator OUT valve is a two-position valve, and the pedal feeling generator is formed by repeatedly opening and closing the two-position valve.

7. The brake apparatus according to claim 1, wherein the pedal feeling generator adjusts an operation speed when the brake pedal is operated.

8. The brake apparatus according to claim 1, wherein the pedal feeling generator adjusts an operation pressing force when the brake pedal is operated.

9. The brake apparatus according to claim 1, wherein the pedal feeling generator includes the stroke simulator IN valve, and the stroke simulator IN valve is a one-way valve that permits only a flow of the brake fluid from the other chamber to the first oil passage.

10. A brake apparatus comprising:
a first oil passage connecting a master cylinder configured to be activated according to a brake operation performed by a driver to generate a hydraulic pressure, and a wheel cylinder provided at a wheel;
a pump configured to generate the hydraulic pressure in the first oil passage with use of brake fluid supplied from a reservoir;
a cut valve provided in the first oil passage between the pump and the master cylinder;
a stroke simulator including a piston configured to be axially activated in a cylinder by the brake fluid and dividing at least an inside of the cylinder into two chambers, the stroke simulator being configured to generate an operation reaction force accompanying the brake operation performed by the driver by the activation of the piston;
a second oil passage connecting one of the two chambers of the stroke simulator and a portion in the first oil passage between the cut valve and the master cylinder;
a third oil passage connecting the other chamber of the stroke simulator and a portion in the first oil passage between the cut valve and the wheel cylinder;
a fourth oil passage connecting the third oil passage and a low-pressure portion;
a stroke simulator OUT valve provided in the fourth oil passage; and
a control unit configured to control the pump, the cut valve, and the stroke simulator OUT valve,
wherein the control unit includes a wheel cylinder pressure increase control unit configured to, according to a state of the brake operation performed by the driver, drive the pump and activate the cut valve and the stroke simulator OUT valve in a valve-closing direction, cause the brake fluid to flow from the master cylinder into the one chamber by an amount according to an amount of the brake operation to activate the piston, and increase a pressure in the wheel cylinder by the brake fluid as much as the amount according to the amount of the brake operation that flows out from the other chamber via the third oil passage due to an increase in a volume of the one chamber, thereby assisting the generation of the hydraulic pressure in the wheel cylinder using the pump, and a pedal feeling generation unit configured to, when a state of the wheel cylinder, the first oil passage, or the third oil passage shifts to a predetermined state, activate the stroke simulator OUT valve in a valve-opening direction to cause the brake fluid in the other chamber to flow out to the low-pressure portion via the fourth oil passage while restricting the brake fluid in the other chamber to a predetermined flow amount.

11. The brake apparatus according to claim 10, wherein the pedal feeling generation unit controls a valve-opening state of the stroke simulator OUT valve.

12. The brake apparatus according to claim 10, further comprising an orifice portion in the fourth oil passage.

13. The brake apparatus according to claim 12, wherein the orifice portion is provided the low-pressure portion side with respect to the stroke simulator OUT valve.

14. The brake apparatus according to claim 10, wherein the stroke simulator OUT valve is a proportional control valve, and the pedal feeling generation unit is formed by controlling the proportional control valve to a predetermined valve-opening amount.

15. The brake apparatus according to claim 10, wherein the stroke simulator OUT valve is a two-position valve, and the pedal feeling generation unit is formed by repeatedly opening and closing the two-position valve.

16. A brake apparatus comprising:
a pump configured to generate a hydraulic pressure in a first oil passage with use of brake fluid supplied from a reservoir to generate a hydraulic pressure in a wheel cylinder, the pump including a first one-way valve that permits a flow of the brake fluid to the first oil passage;

a stroke simulator including a piston configured to be axially activated in a cylinder by the brake fluid supplied from a master cylinder and dividing at least an inside of the cylinder into two chambers, the stroke simulator being configured to generate an operation reaction force accompanying a brake operation performed by a driver by the activation of the piston;

a second oil passage provided between one of the two chambers of the stroke simulator and the master cylinder;

a third oil passage provided between the other chamber of the stroke simulator and the first oil passage, the third oil passage being an oil passage for transmitting the brake fluid flowing out of the other chamber to the first oil passage, the third oil passage including a second one-way valve that permits a flow of the brake fluid to the first oil passage;

a fourth oil passage branching from a portion in the third oil passage between the second one-way valve and the other chamber, the fourth oil passage being provided between the other chamber and the reservoir, the fourth oil passage being configured to permit both a flow of the brake fluid from the other chamber and a flow of the brake fluid from the reservoir; and a characteristic adjustment unit provided in the fourth oil passage and configured to adjust a flow characteristic of the brake fluid flowing through the fourth oil passage.

17. The brake apparatus according to claim 16, wherein an operation speed when the driver performs the brake operation is adjusted by the characteristic adjustment unit.

18. The brake apparatus according to claim 16, wherein an operation force when the driver performs the brake operation is adjusted by the characteristic adjustment unit.

19. The brake apparatus according to claim 16, wherein a stroke simulator OUT valve is provided in the fourth oil passage, and the characteristic adjustment unit includes the stroke simulator OUT valve.

20. The brake apparatus according to claim 19, wherein the stroke simulator OUT valve includes an orifice portion.

* * * * *